US006782146B2

(12) United States Patent
Hellman et al.

(10) Patent No.: US 6,782,146 B2
(45) Date of Patent: Aug. 24, 2004

(54) MULTIPLE POLARIZATION COMBINER-SPLITTER-ISOLATOR AND METHOD OF MANUFACTURING THE SAME

(75) Inventors: Scott M. Hellman, Aliso Viejo, CA (US); David S. Marx, Long Beach, CA (US); Bryan P. Paolini, Irvine, CA (US); Paul A. Townley-Smith, Irvine, CA (US); Michael Ushinsky, Irvine, CA (US)

(73) Assignee: Corning Incorporated, Corning, NY (US)

( * ) Notice: Subject to any disclaimer, the term of this patent is extended or adjusted under 35 U.S.C. 154(b) by 251 days.

(21) Appl. No.: 09/967,315

(22) Filed: Sep. 28, 2001

(65) Prior Publication Data

US 2003/0063832 A1 Apr. 3, 2003

(51) Int. Cl.[7] .............................. G02B 6/27; G02B 6/36
(52) U.S. Cl. .......................................... 385/11; 385/78
(58) Field of Search .............................. 385/11, 31, 59, 385/60, 63, 65–68, 71, 72, 78

(56) References Cited

U.S. PATENT DOCUMENTS

| 4,973,124 A | 11/1990 | Kaede |
| 5,386,314 A | 1/1995 | Jopson |
| 5,400,164 A | 3/1995 | Kurtzke et al. |
| 5,424,863 A | 6/1995 | Gertel |
| 5,485,272 A | 1/1996 | Dirksen et al. |
| 5,502,781 A | 3/1996 | Li et al. |

(List continued on next page.)

FOREIGN PATENT DOCUMENTS

| EP | 0725289 | 8/1996 |
| EP | 0738909 | 10/1996 |
| EP | 0758754 | 2/1997 |
| WO | WO0109655 | 2/2001 |
| WO | WO03021311 | 3/2003 |
| WO | WO03021318 | 3/2003 |

OTHER PUBLICATIONS

Structural Analysis in Microelectronics and Fiber Optics—1997– (pp. 34–54 of The Electrical and Electronic Packing Division—vol. 21; The American Society of Mechanical Engineers).
8 pages from www.ma.man.ac.uk/~hewitt/experiments/html.
5 pages From Fluent Incorporated Website ("Flow Past a Circular Cylinder").
Publication entitled Applications of Grin–Rod Lenses in Optical Fiber Communications Systems (pp. 1127–1136; dated Apr. 1980; Applied Optics vol. 19, No. 7, Apr. 1, 1980).

*Primary Examiner*—Rodney Bovernick
*Assistant Examiner*—Sarah U Song
(74) *Attorney, Agent, or Firm*—Price, Heneveld, Cooper, DeWitt & Litton; Mary Y. Redman

(57) ABSTRACT

A multiple-port optical device combines two polarization combiner-splitters into one package. Two single mode optical fibers are enclosed in a first ferrule of the package and are optically coupled to four polarization maintaining fibers enclosed in a second ferrule of the package. The optical fibers are precisely positioned using improved fiber ferrules comprising various capillary designs. A prism is mounted between the single mode fibers and the polarization maintaining fibers. The fibers are screened for geometric characteristics which aide in precisely positioning the fiber cores. The ferrules, capillaries, fibers, and adhesives are combined to reduce adverse thermal effects over a broad range of environmental conditions. The precise positioning and geometry of the optical fibers aids in optically aligning the elements of both polarization combiner-splitters in the one package. The invention is applicable to related devices such as multiple isolators, combiner-isolators, splitter-isolators, and the like.

55 Claims, 21 Drawing Sheets

U.S. PATENT DOCUMENTS

| | | | |
|---|---|---|---|
| 5,604,629 A | | 2/1997 | Hunter et al. |
| 5,615,052 A | | 3/1997 | Doggett |
| 5,619,605 A | | 4/1997 | Ueda et al. |
| 5,675,683 A | * | 10/1997 | Takahashi et al. ............ 385/78 |
| 5,682,452 A | | 10/1997 | Takahashi |
| 5,692,081 A | | 11/1997 | Takahashi |
| 5,724,165 A | | 3/1998 | Wu |
| 5,737,104 A | | 4/1998 | Lee et al. |
| 5,740,288 A | | 4/1998 | Pan |
| 5,748,820 A | | 5/1998 | Le Marer et al. |
| 5,768,458 A | | 6/1998 | Ro et al. |
| 5,796,889 A | * | 8/1998 | Xu et al. ...................... 385/24 |
| 5,799,121 A | | 8/1998 | Duck et al. |
| 5,838,847 A | | 11/1998 | Pan et al. |
| 5,917,626 A | | 6/1999 | Lee |
| 6,014,244 A | * | 1/2000 | Chang ........................ 359/281 |
| 6,014,256 A | | 1/2000 | Cheng |
| 6,038,357 A | | 3/2000 | Pan |
| 6,084,994 A | | 7/2000 | Li et al. |
| 6,134,360 A | | 10/2000 | Cheng et al. |
| 6,173,106 B1 | | 1/2001 | DeBoynton et al. |
| 6,175,668 B1 | | 1/2001 | Borrelli et al. |
| 6,192,175 B1 | | 2/2001 | Li et al. |
| 6,241,397 B1 | * | 6/2001 | Bao et al. ..................... 385/73 |
| 6,282,025 B1 | * | 8/2001 | Huang et al. ............... 359/495 |
| 6,433,924 B1 | * | 8/2002 | Sommer .................. 359/337.1 |

* cited by examiner

VIEW A-A

VIEW B-B

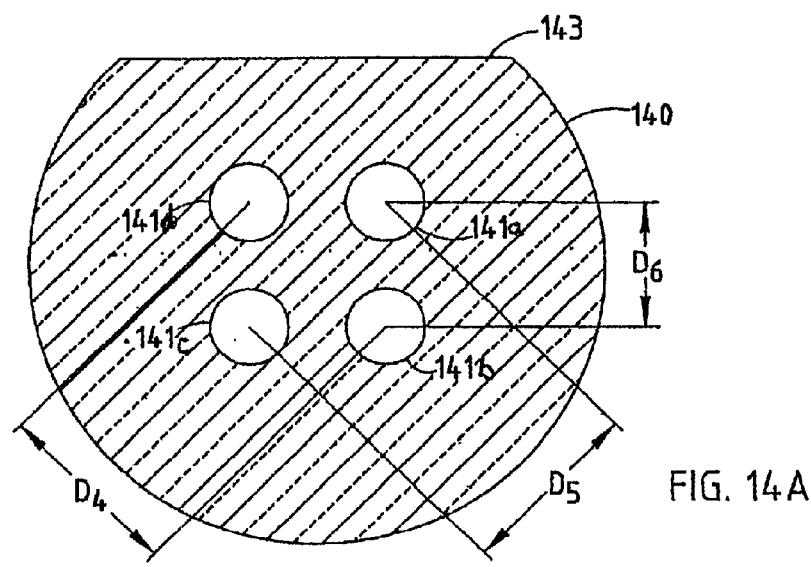
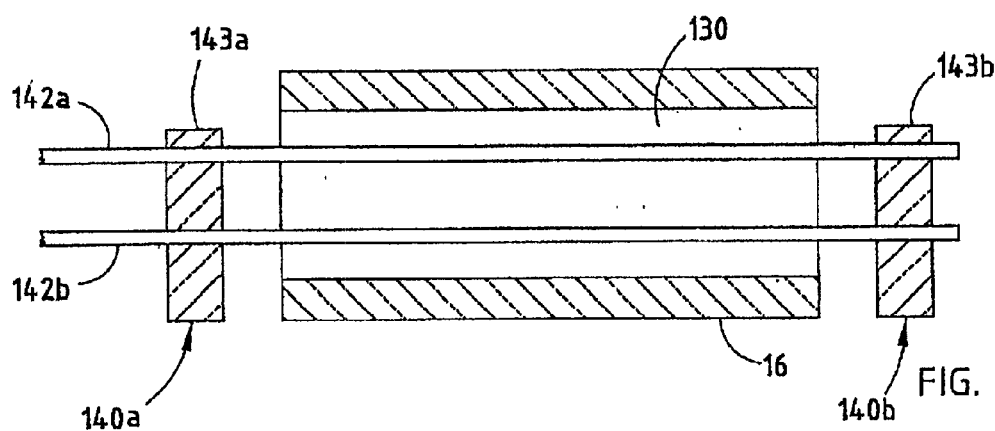

MULTIPLE POLARIZATION COMBINER-SPLITTER-ISOLATOR AND METHOD OF MANUFACTURING THE SAME

BACKGROUND OF THE INVENTION

1. Field of the Invention

The present invention relates to optical telecommunication systems and, in particular, to devices for combining, splitting, and isolating light beams and methods for making the same.

2. Technical Background

Three port combining and splitting packages are widely used in local and long distance optical telecommunication networks. These networks comprise various polarization combining and splitting assemblies as part of Raman amplifiers and to increase the number of channels in a system. The necessity to design reliable optical devices for such systems, which are subject to various thermal and mechanical loads during their 20 to 25 year lifetime, is of significant importance. A typical example of such optical devices is a polarization-splitter package. A typical beam-splitter package comprises two assemblies. One assembly comprises one input single-mode (SM) optical glass fiber inserted into a single-capillary ferrule to produce a fiber-ferrule sub-assembly, a collimating lens, and a prism. A variety of optical blocks such as such as combiners, combiner-isolators, splitter-isolators, isolators, and the like are also substituted for the prism to form other useful devices. The optical components of this single-mode fiber assembly are embedded into an insulating glass tube, which in turn is mechanically protected by a metal housing. In a typical 3-port package the above single-mode fiber beam-splitting assembly is combined with an output collimating assembly leading to a pair of polarization-maintaining (PM) optical fibers. Beam-splitting packages are expensive and represent a significant cost in a typical communication system. Further, beam-splitting packages typically exhibit insertion losses higher than desired, resulting in degraded overall performance of the communications system or module. The problem is particularly acute during exposure to ambient operating conditions where temperature is variable.

Typical input glass ferrules enclosing the single-mode fibers employ a single capillary with relatively short (0.7–1.2 mm) fiber-receiving conical lead-in ends. With such input ferrules, the optical fiber is subjected to an S-bending over the short conical end portion which typically exceeds 50% of the fiber diameter (for a fiber having a 125 $\mu$m diameter) on a span of about 6 to 10 diameters in length. This excessive micro bending increases the insertion losses. Fiber-ferrule subassemblies employing such ferrules are manufactured by inserting the optical fiber stripped of its polymer coating into the ferrule capillary; epoxy bonding the fiber into the ferrule capillary, including the conical end portion; grinding and polishing an angled facet on the fiber-ferrule; and depositing on the polished surface an anti-reflection (AR) coating. Once finished, the fiber-ferrule is aligned and assembled with the collimating lens and then embedded into the insulating glass tube, which, in turn, is protected by a metal housing.

There are two different technical solutions used in the design of bonds securing the components of an optical assembly. A low compliance bond between thermally well matched glass fibers and the glass ferrule is an approach commonly used by some manufacturers. The adhesives used are heat-curable epoxies with high Young's modulus (E>100,000 psi) and moderate to high thermal expansion coefficients ($\alpha$=40–60 $10^{-6\circ}$ C.$^{-1}$). A typical example would be 353 ND EPO-TEK epoxy adhesive. In addition, the bond thickness used is very small.

Silicon adhesives are used to bond thermally mismatched glass tubes with metal housings and glass optical elements with metal holders. In these joints, a high compliance design is used. The silicones, which can be cured between 20–150° C. in the presence of moisture, are typically characterized by an extremely low Young's modulus (E<500 psi) and high thermal expansion ($\alpha$=180–250 $10^{-6\circ}$ C.$^{-1}$). A typical example would be DC 577 silicone, which can be used to bond, for example, a metal optical filter holder to a collimating lens.

Adhesive bonding with subsequent soldering or welding is used to encapsulate a polarization-splitting assembly into a three-port package. Such a polarization-splitting package enclosure, which is typically formed of six to eight concentric protective units, has micron transverse tolerances. Maintaining these tolerances requires precision machining and may require time-consuming alignment and soldering with frequent rework. As a result of these limitations, the optical performance specifications are lowered and cost is increased. As an example, soldering may include several re-flow cycles. This induces local thermal stresses in the nearby adhesive bonds and leads to the degradation of the polymer adhesive which can result in repositioning of optical components and a shift in the optical performance. With such design, soldering may also result in the contamination of optical components through direct contact with molten solder and/or flux.

However, it is desirable to obtain a high accuracy thermally compensated optical multiple-port package that can be relatively inexpensive, reliable, and have a low insertion loss. Additionally, a package design should be adequate not only to mechanically protect the fragile optical components but also to compensate for and minimize the thermally induced shift in optical performance. Further, it is desirable to obtain a multiple-port package, such as six port packages, with the same qualities since they further reduce costs and reduce size. Thus, there exists a need for such optical packages and a process for manufacturing such optical packages, which is miniaturized, has a low insertion loss, is inexpensive to manufacture, and which results in a device having reliable, long-term operation.

SUMMARY OF THE INVENTION

The present invention provides a dual polarization combiner-splitter package and provides a method of manufacturing the package from components such as input ferrules, collimating lenses (e.g. aspheric lens), optical fibers, and prisms, utilizing bonding adhesives in a manner which allows the alignment of the individual components relative to one another with a precision and a manufacturability that makes it possible to produce commercial devices having six or more ports. This had heretofore not been achieved. In one aspect, the invention includes an improved input ferrule and prism holder which permits bonding through the utilization of UV and thermally curable adhesives and improved thermal curing to reduce relevant internal stresses in the assembly so formed. For assemblies having multiple pairs of fibers (e.g., six port devices) the invention also provides improved fiber ferrule designs and manufacturing methods for devices that have low IL, operate over a wide temperature range, are reliable, and cost effective.

In one aspect of the invention, improvements to fiber ferrules are provided including capillary designs and tolerances. The invention provides designs for capillaries which resist movement of the optical fibers during adhesive curing, soldering, welding, and environmental thermal changes. One technique uses washers to precisely position optical fibers in a capillary. Yet another aspect of the invention is the selection of optical fibers based on geometric properties such as: outer (cladding) diameter, circularity of the cladding (ovality), and core concentricity. In another aspect, the invention teaches matching the separation distance (SD) between optical fibers on each end of the package. Tolerances for the separation distances are provided which make possible the commercial manufacturability of six-port devices.

Methods embodying the present invention include the steps of providing ferrules with capillaries having certain shapes and satisfying predetermined tolerances for the walls of the capillaries, providing single-mode optical fibers and polarization mode optical fibers satisfying predetermined tolerances for outer diameter, ovality, and centricity, providing prism holders, bonding the prism to the holder with liquid adhesive, bonding the prism holder to one of the collimating lenses, and aligning the single-mode fibers with the polarization mode fibers. In an embodiment of the invention, the subassembly is subsequently thermally cured through an accelerated dark cure sequence followed by a final high temperature curing. In another embodiment of the invention, UV radiation is applied to the prism holder/prism interface. The UV light source may be dithered such that UV radiation uniformly covers the cylindrical interface between the prism holder and the outer surface of the collimating lens.

In a preferred method of manufacturing the invention, subsequent to the UV curing process, the assembly is cured through a stress relaxation cycle at about 40–50° C. for two to four hours followed by a thermal curing cycle of about 95 to 110° C. for one to two hours.

In one embodiment of the invention, the ferrules are employed with an input cone having an axial length greater than about 2.5 mm to reduce S-bending of input fiber, thereby minimizing resultant insertion losses. In another embodiment of the invention, a generally cylindrical filter holder has an annular seat formed in one end for receiving a prism and a lens-receiving aperture at an opposite end having an internal dimension of sufficient dimensions to enclose a portion of a collimating lens. The preferred prism holder is made of glass having a coefficient of thermal expansion similar to the adjacent collimating lens. The prism holder may also be made of suitable metals preferably having similar thermal expansion characteristics. One embodiment for the prism holder includes slots or openings in the lateral surface such that UV light enters and cures adhesive between the lens and prism holder. An optical splitting assembly of a preferred embodiment of the present invention includes such an improved ferrule enclosing two single-mode fibers and a prism holder coupled in alignment with another ferrule enclosing four polarization-maintaining fibers and both assemblies enclosed in a suitable housing.

The methods and apparatus described herein facilitate the manufacture of a six-port optical device which results in several advantages. For example, in a six-port device having two single-mode optical fibers in the input collimating assembly coupled through a prism to two pairs of polarization-maintaining fibers operates with two transmitted light beams. The two beams are split into four polarized beams which are transmitted to the polarization-maintaining fibers. The package thereby functions as two polarization beam splitters in a single package and thus reduces by half the number of prisms, collimating lenses, ferrules, and enclosure units. Thus, for example, the same six-port combiner-splitter package can be used in communications systems and laser applications and reduce by one half the number and also the size of the packages needed as compared to three-port packages.

The manufacturing method and optical element assembly of the present invention, therefore, provides an improved performance optical assembly utilizing unique ferrules, prism holder, and an assembly method for providing a low cost, highly reliable, and improved performance combiner-splitter package and using these packages in optical modules which can be used in various optical communications system.

The devices of the instant invention are applicable for packages that comprise similar optical devices including crystal-based isolators, circulators and the like.

Additional features and advantages of the invention will be set forth in the detailed description which follows and will be apparent to those skilled in the art from the description or recognized by practicing the invention as described in the description which follows together with the claims and appended drawings.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description serve to explain the principals and operation of the invention.

BRIEF DESCRIPTION OF THE DRAWINGS

FIG. 14A is a view of an alignment washer;

FIG. 14B is a cross-sectional exploded view of a fiber-ferrule assembly using alignment washers;

DETAILED DESCRIPTION OF THE PREFERRED EMBODIMENTS

Figure 1:
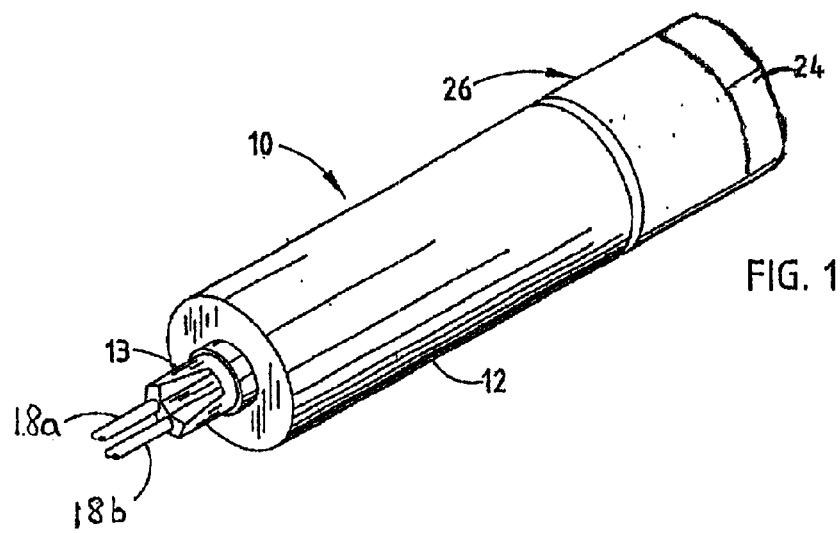
FIG. 1 is a perspective view of a prism assembly embodying the present invention.

Reference will now be made in detail to the present preferred embodiments of the invention, examples of which are illustrated in the accompanying drawings. Wherever possible, the same reference numerals will be used throughout the drawings to refer to the same or like parts.

Figure 2:
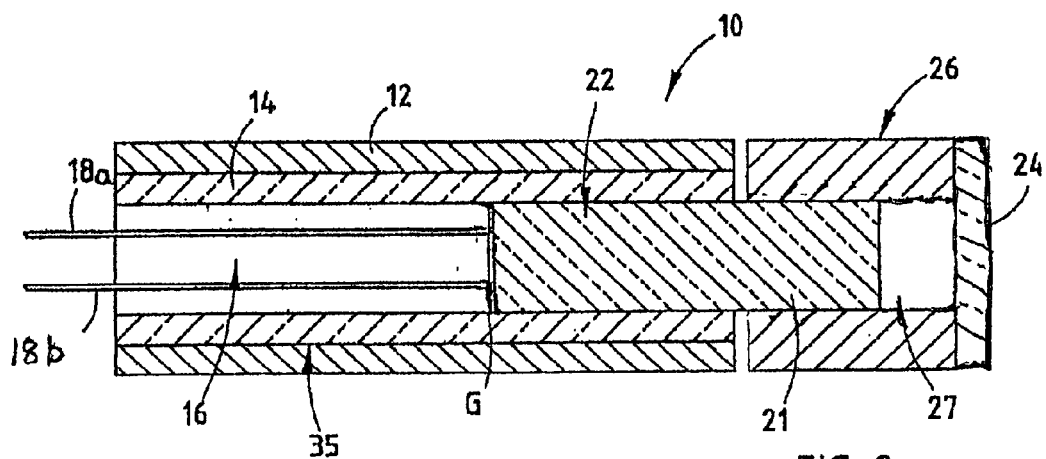
FIG. 2 is a partial vertical cross-sectional schematic view of the assembly shown in FIG. 1.

Referring initially to FIGS. 1 and 2, a brief description of an optical element (e.g., prism) assembly 10 is first presented. The invention is described and illustrated using an exemplary six-port polarization beam splitting device, however, some features of the invention also apply to other multiple-port devices such as three-port devices. Also, the invention is equally applicable to polarization combiners, combiner-isolators, beam splitter-isolators, isolators, and the like. For the various types of multiple-port devices the number, position, and orientation of fibers in ferrule 16 changes accordingly.

The dual-fiber collimating and splitting assembly 10 includes an outer cylindrical metal housing 12, which is bonded at 13 (FIG. 1) around the two input single-mode optical fibers 18a and 18b. Housing 12 surrounds an insulating cylindrical boro-silicate or fused silica sleeve 14 (FIG. 2) within which there is preferably mounted a single capillary glass ferrule 16 receiving two input optical fibers 18. The ends of fibers 18 in ferrule 16 face a collimating lens 22, such as, for example, an aspheric lens, which has polished facets on the input end, and (as seen in FIG. 2) which face and align with the ends of optical fibers 18 held in place by ferrule 16. Lens 22 collimates light from input fibers 18 into parallel rays, transmitting them to a prism 24 or other appropriate optical element. The preferred prism is a Wollaston prism, however, those skilled in the art recognize that other equivalent prisms and crystal devices may also be used.

The end of the collimating lens 22 that is closest to prism 24 is referred to as the output end of collimating lens 22. Aspheric collimating lens 22 is preferably molded from a material with low stress birefringence to improve insertion loss. A prism holder 26 is mounted to the end 21 of the collimating lens 22 according to the method of the present invention and includes an axial aperture 27 allowing light from lens 22 to impinge upon prism 24. Prism holder 26 also secures prism or crystal 24 in alignment with the collimating lens 22 with aperture 27 extending between the prism 24 and lens 22. The fiber-ferrule 16, lens 22, and insulating sleeve 14 are collectively referred to as the input collimating assembly 35 (if this were part of a combiner instead of a splitter, the direction of the light beams would be reversed and this could thus be referred to as an output collimating assembly). Input collimating assembly 35 may also include cylindrical metal housing 12.

Figure 3A:
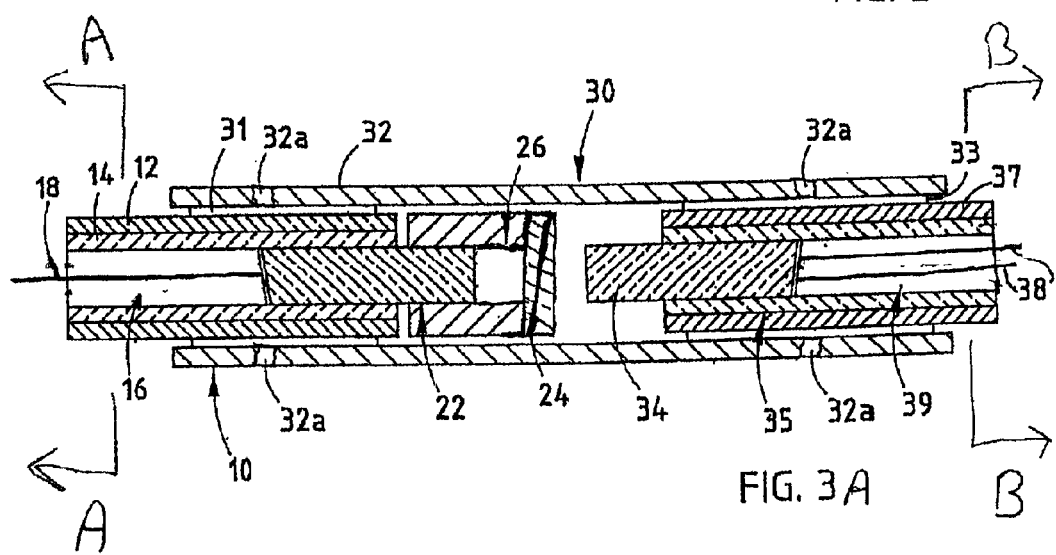
FIG. 3A is a vertical cross-sectional schematic view of a six-port prism assembly embodying the present invention (rotated 90° relative to FIG. 2 view)

A similar four-fiber collimating assembly structure is collectively referred to as an output collimating assembly 35' and is shown in FIG. 3A. Only two of the four polarization-maintaining fibers 38 are shown since the other two fibers are hidden behind the two visible fibers 38.

Before describing the manufacture of the assembly 10 forming a part of an overall six-port splitter, a six-port splitter 30 is briefly described. FIG. 3A is also representative of a multiple-port device, however, for a multiple-port device (other than a six-port) the number and position of fibers in ferrules 16 and 39 change according to the embodiment.

Figure 3B:
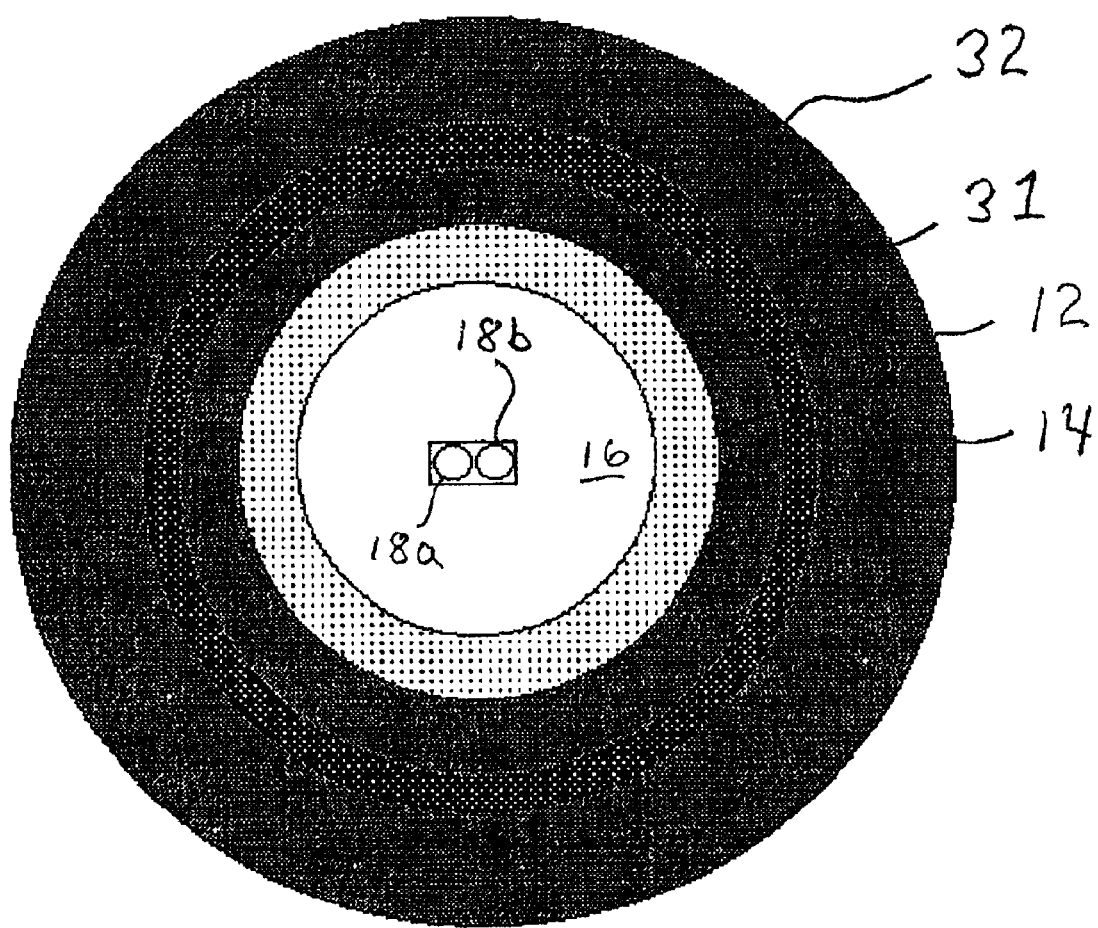
FIG. 3B is a cross-section view of the assembly in FIG. 3A along view A—A.
Figure 3C:
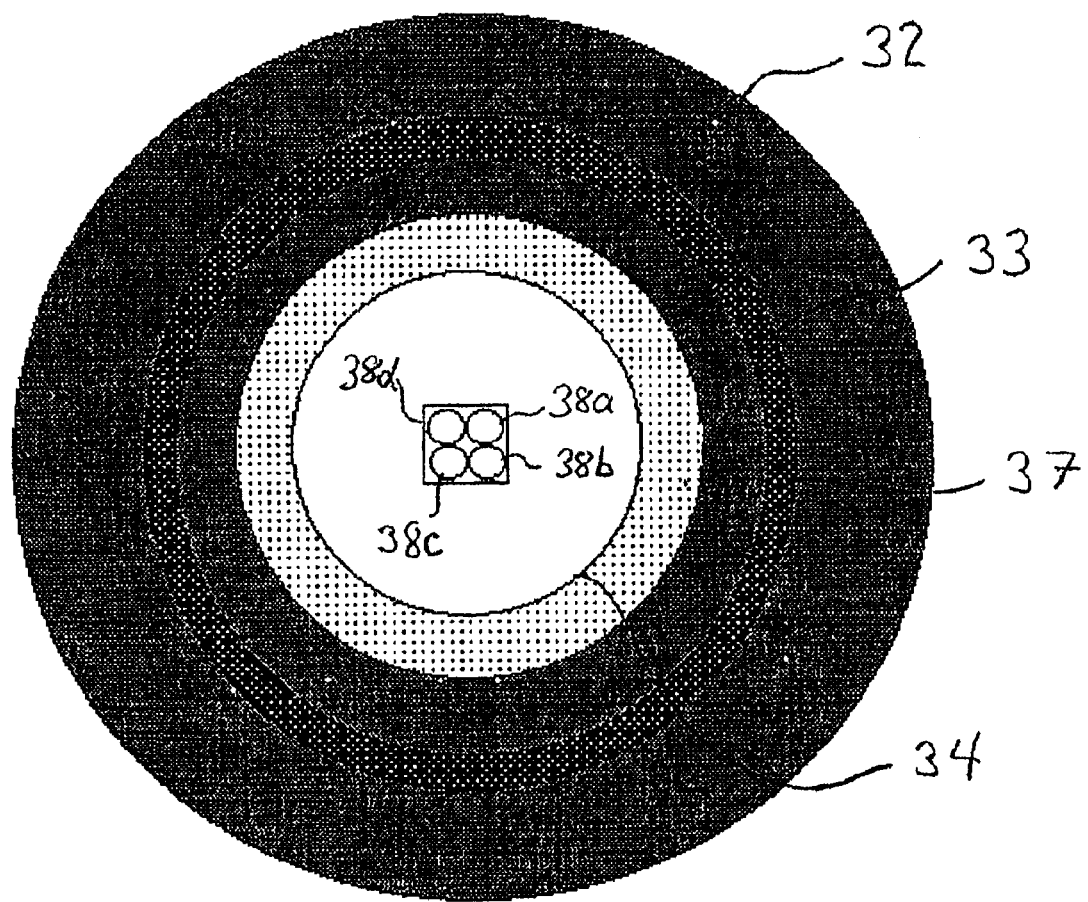
FIG. 3C is a cross-section view of the assembly in FIG. 3A along view B—B.

There are two input single-mode fibers 18, however only one is shown in FIG. 3A and the remaining fiber is hidden. As shown in FIG. 3A, six-port splitter 30 includes an outer cylindrical metal sleeve 32 into which assembly 10 is mounted and secured by a cylindrical interface of solder and/or welding material 31 applied to the solder joint as seen in schematic diagram of FIG. 3A. Solder and/or weld material 31 may be applied through suitable apertures 32A in metal sleeve 32. The output signal from prism 24 is received by an aligned collimating output lens 34 similarly secured within a boro-silicate or fused silica glass sleeve 36 surrounded by a metal sleeve 37 which, in turn, is mounted within the interior of outer protective sleeve 32 utilizing a cylindrical solder interface 33. The output lens 34, output ferrule 39, output glass sleeve 36, and metal sleeve 37 form the output collimating assembly 35'. The output polarization-maintaining optical fibers 38a, 38b, 38c, and 38d couple the respective polarized signals from six-port splitter 30 to the communication links or other devices in which the six-port splitter 30 is installed. Thus, for example, the six-port splitter 30 may be employed to receive two signals via input single-mode optical fibers 18a and 18b, split the two signals into four polarized signals via prism 24, and output the four resulting polarized signals to polarization-maintaining fibers 38. FIGS. 3B and 3C illustrate the view along views A and B of FIG. 3A. The light signal input along fiber 18a is split into two polarized beams. One beam is directed to polarization maintaining fiber 38d and the other orthogonal polarized beam is directed to fiber 38c. Similarly, the light signal input along fiber 18b is split and directed to fibers 38a and 38b.

The method of assembling assembly 10 and its structural elements, are unique and is described in detail below. Further, the specific method of aligning output collimating assembly 35' within sleeve 32 will also be described below.

Figure 4:
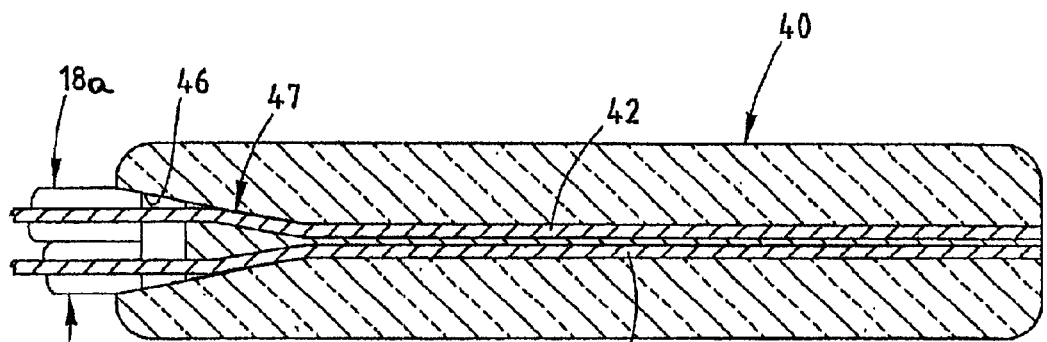
FIGS. 4 and 4A are enlarged vertical cross-sectional and right end view, respectively, of a prior art ferrule employed in a prior art prism assembly.

One problem associated with prior art ferrules is illustrated by FIG. 4 showing a vertical schematic cross-sectional view of a prior art input ferrule 40. Ferrule 40 is made of a conventional glass material such as fused silica or boro-silicate glass and includes a pair of spaced-apart capillaries 42 and 44 having a diameter sufficient to receive the stripped input and reflective optical fibers 18 having a diameter of about 125 $\mu$m. The overall diameter, however, of optical fibers 18 includes a protective polymeric sheath and is approximately 250 $\mu$m. Optical fibers 18a and 18b are cemented within the conical input section 46 of the prior art ferrule 40 utilizing a thermally curable epoxy adhesive providing a strain-relief connection of the coated fibers 18 within the glass ferrule. As the stripped optical fibers 18 exit the polymeric sheath and enter the capillary tubes 42 and 44 over the length of 1.2 mm of the conical input section 46, they are bent at area 47 schematically shown in FIG. 4. This S-bending of the optical fibers interconnection to the ferrule 40 results in deflection of the fiber, which exceeds 50% of the fiber diameter. This induced micro bending of the fiber increases insertion loss of the signals applied to the lens 22 due to the geometry of ferrule 40.

Figure 4A:
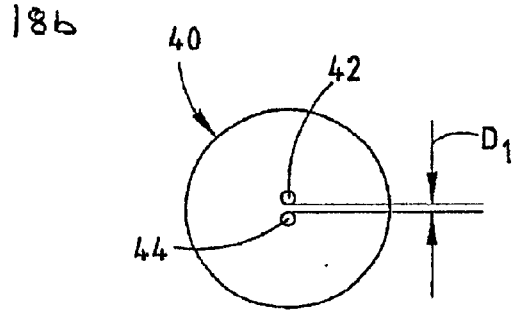

Capillaries 42 and 44 of ferrule 40 are spaced apart a distance "D1", as shown in FIG. 4A that with the coned length provided by prior art ferrules as shown in FIG. 4, results in such excessive micro-bending of the optical fibers and resultant insertion losses. The alternate ferrule construction in which a single elliptical capillary is provided for receiving adjacent optical fibers and having a similar input cone construction suffers even more from the bending problem. In order to greatly reduce the insertion loss due to the undesirable S-bending of input fibers, an improved ferrule 16 of the present invention, which forms part of the assembly 10 as seen in FIGS. 1 and 2, is employed and is described in FIGS. 5 and 5A.

Figure 5:
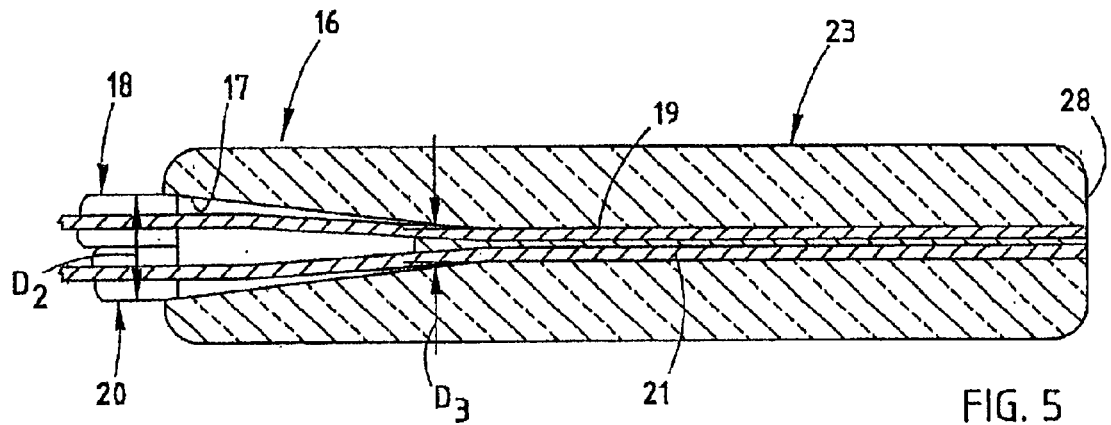
FIGS. 5 and 5A are an enlarged vertical cross-sectional view and right end view, respectively, of a ferrule employed in the prism assembly of FIGS. 1 and 2 and the six-port polarization splitter of FIG. 3.
Figure 5A:
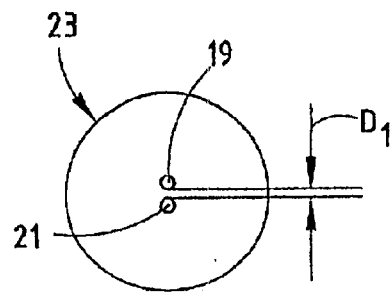

In FIG. 5, a ferrule 16 is shown which has an input cone 17 with an axial length in the preferred embodiment in excess of 2 mm and preferably 2.4 mm or approximately twice the length of prior art input cones. The input diameter "D2" of input cone 17 is approximately 0.8 mm to accommodate the 500 $\mu$m combined diameter of input fibers 18 and allow room for epoxy to bond the fibers within cone 17. The exit diameter "D3" of cone 17 adjacent capillaries 19 and 21, which receive and secure the optical fibers 18 therein, is preferably determined as:

$$D3 = 2f_d + D1$$

or $$D3 = 250 \ \mu m + D1$$

where $f_d$ is the fiber diameter with the sheath material removed

This accommodates any spacing D1 between the fibers and the 125 $\mu$m diameters of each of the stripped input and reflective fibers, allowing also approximately a 1.0 $\mu$m gap at the input to capillary tubes 19 and 21 for epoxy to securely seat the input fibers 18 within ferrule 16. To obtain the best possible performance, the fibers should be selected for their geometric properties. Three important properties and the preferred tolerances are outer cladding diameter of 125 $\mu$m+/−0.2 $\mu$m, non-circularity of the cladding less than 0.2%, and core to cladding concentricity is less than 0.2 $\mu$m. By expanding the axial length "L" of cone 17 to nearly twice that of prior art input ferrules, S-bending is substantially avoided, providing substantially a nearly equal optical path length for both the input fibers and reducing insertion losses. This technique is also applicable to ferrules having more than two optical fibers and to ferrules with single or multiple capillaries.

The fibers are epoxied within the ferrule 16 with an epoxy adhesive such as, for example, 353 ND EPO-TEK epoxy adhesive available from Epoxy Technology, Billerica, Mass., and cured at about 110° C. for one and one-half hours. It is preferable to post-cure the assembly at 125–130° C. for one-half hour to reduce moisture absorption. The end-face 28 of the ferrule with inserted and bonded optical fibers are ground and polished to produce approximately 8° angle elliptical facet to the axis of the ferrule. Ferrule 16 is then cemented within the surrounding thermally insulating glass sleeve 14 (FIG. 2) to form input collimating assembly 35. Prior to the insertion of the ferrule 16 into sleeve 14, the lens 22 has been installed and cemented in place. The ferrule may be aligned with a gap "G" (FIG. 2) of about 1 to 1.5 $\mu$m between the ends of the lens 22 and the ferrule to allow the axial and rotational active alignment of the ferrule, if desired, to the lens 22 by rotating the ferrule within sleeve 14 and axially positioning it to accommodate the surface angle of the lens 22, which may run between 7.8° to 8.1°. For a six-port assembly, signals may be applied to the input fibers 18 while monitoring the output of the lens 22 within sleeve 14 while the ferrule is axially and rotationally positioned to optimize alignment. This may improve insertion loss and maximum signal coupling between the input optical fibers 18 and the input collimating lens 22, which subsequently receives the prism holder and prism therein as now described in connection with FIG. 6.

Figure 6:
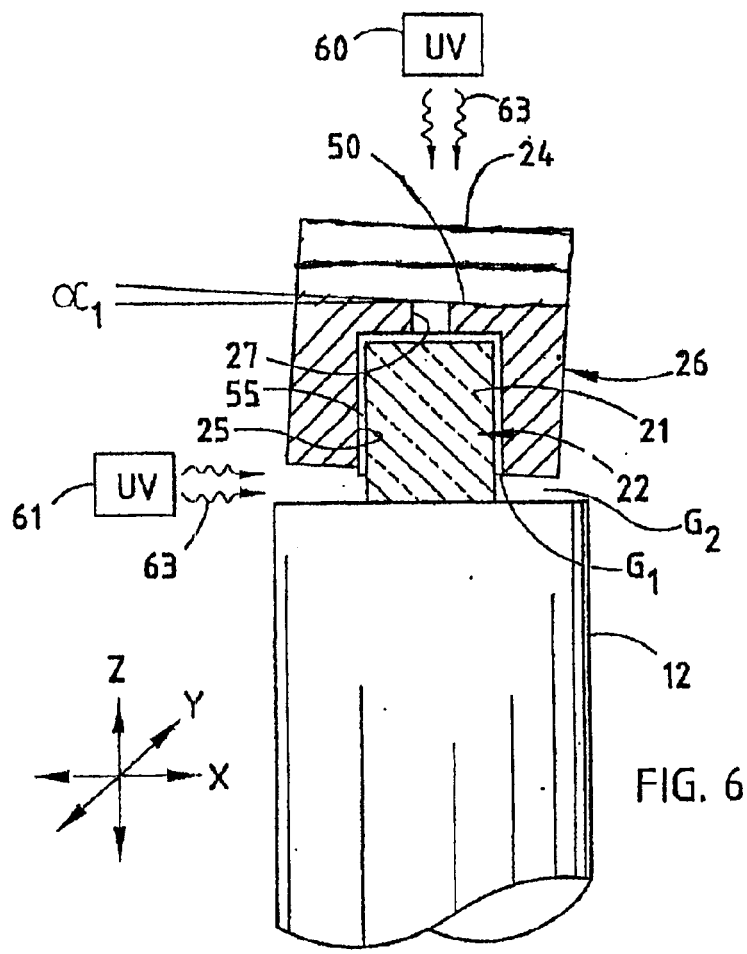
FIG. 6 is an enlarged vertical cross-sectional schematic view of an improved prism holder of the present invention also illustrating its method of assembly.

Referring now to FIG. 6, the subsequent positioning of prism 24 and prism holder 26 onto end 21 of the lens 22 is described. A prism 24 with a desired splitting angle is selected for use in the assembly 10. An input collimating assembly 10 is selected having a ferrule 16 that has a SD that is preferably equal to the SD defined by the polarization-maintaining fibers 38. The SD is accurately measured, preferably within 0.5 $\mu$m, and the prism holder 26 is mounted on the selected input collimator assembly 35. The separation distance (SD) is defined as the distance between the center of the fiber core of two optical fibers. The SD for two pairs of polarization-maintaining fibers 38 is the distance between two fibers having the same polarization. The remaining two fibers presumably have nearly the same SD. If the SD for the single-mode fibers is not equal to the SD of the polarization maintaining fibers 38, the insertion loss may be excessive. Therefore it is important for the SD for the fibers to be approximately equal. Preferably the SD tolerance for the pair of polarization-maintaining fibers is equal to the SD of the single-mode fibers within a tolerance of 0.5 µm. The tolerances are further discussed below in discussion of FIGS. 14 and 15.

Prism holder 26 has a cylindrical aperture 25 at its lower end, as seen in FIG. 6, which overlies the cylindrical diameter of lens 22. Holder 26 is made of a material which has a coefficient of thermal expansion which is close to that of the lens 22 and, in a preferred embodiment of the invention, is a unit made either glass or, alternatively, SS 17-4-PH stainless steel. If the embodiment includes an isolator with a Faraday plate or the like, then holder 26 is preferably made of a magnetic material. Prism holder is preferably made from a glass cylinder and is easily fabricated. Prior to assembling prism holder 26 to lens 22, the prism 24 is mounted to the prism holder 26, which has a seat 50 canted at an angle $\alpha_1$ (FIG. 6) of approximately 0.5° which is sufficient to eliminate reflections. The prism 24 is secured to holder 26 utilizing conventional epoxy or even silicone bonding adhesives, such as DC577 or CV3 2000. In the illustrated embodiment, a commercially available prism having dimension of, for example, 1.4 by 1.4 mm is used. Such prisms are available commercially from a variety of sources. The assembly and methods of the invention can also be used with other optical devices in place of prism 24, such as various crystal-based components (e.g. isolators).

Figure 9:
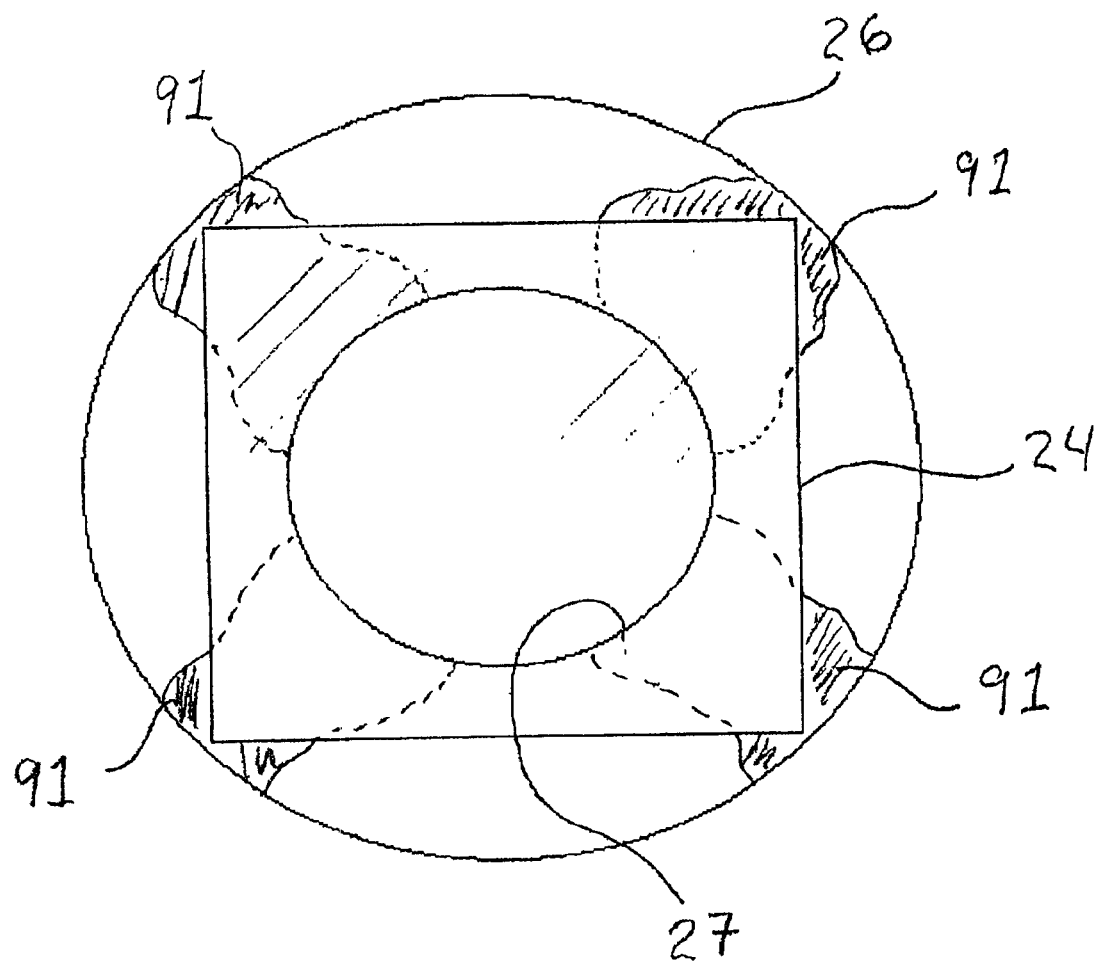
FIG. 9 illustrates the method of applying adhesive between a prism and a prism holder.

The bonding of Prism 24 is preformed with a new method whereby drops of liquid adhesive are applied to the edge of the prism along the prism/holder boundary. Over a period of about three minutes, the liquid adhesive is drawn between the boundary of the prism 24 and the holder 26 without extending into the aperture 27. This is illustrated in FIG. 9 where a transparent prism 24 is shown secured to a holder 26 via adhesive 91. The adhesive 91 is drawn into the small capillaries or spaces between the prism 24 and holder 26 as illustrated by the dashed lines. Over the time of about three minutes, the adhesive will continue to spread and cover most of the boundary layer between the prism 24 and holder 26.

With prism 24 in place in prism holder 26, the holder is adhesively bonded to lens 22 using, for example, one of the adhesives discussed above. Care should be taken so that the adhesive is applied to the sides of the lens 22 and not the end surface where it could interfere with the light beams.

Active alignment is the process of aligning optical elements while applying light signals to the device and monitoring an output signal. This is in contrast to passive alignment which is the process of aligning optical elements in the absence of a light signal.

A variety of UV and thermally curable epoxies were tested, and it was determined that the bonding adhesive which worked unexpectedly well was commercially available EMI-3410, which is a UV and thermally curable filled adhesive available from Electronic Materials, Inc., of Breckenridge, Colo.

In one embodiment of the invention, one or more sources of ultraviolet radiation such as sources 60 and 61 are employed to expose the bonding adhesive at the interface between holder 26 and lens 22 to ultraviolet radiation to cure the bonding adhesive sufficiently such that the desired relationship between the lens 22 and filter 24 is fixed until the adhesive is finally thermally cured.

Figure 7:
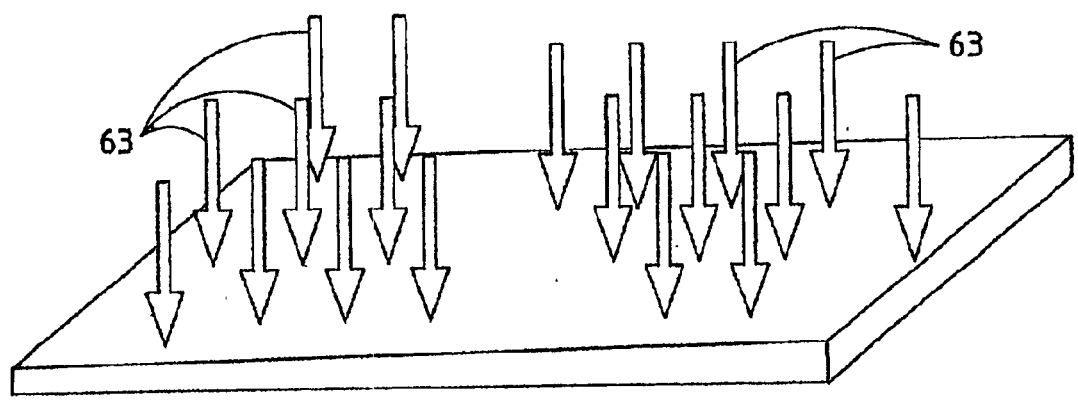
FIG. 7 is a schematic view illustrating the frontal polymerization of a UV or thermally curable bonding adhesive when UV light is propagated transversely through a prism, as illustrated in FIG. 6.
Figure 8:
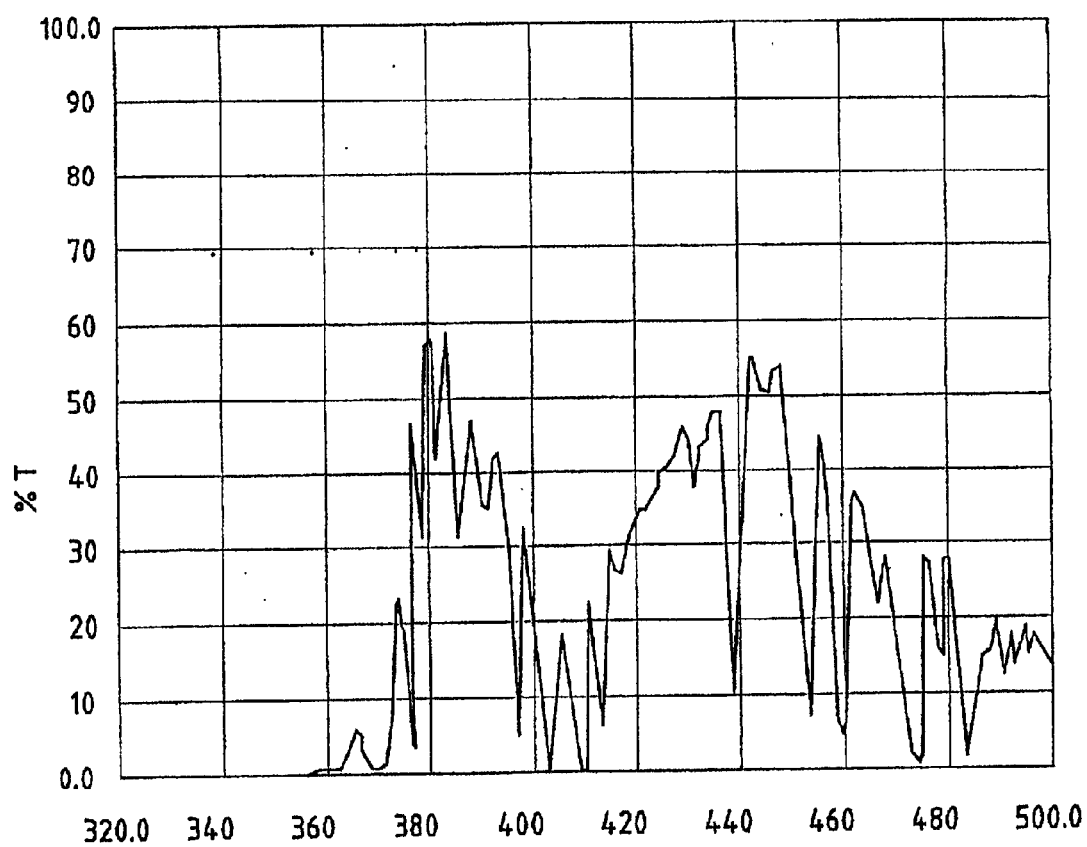
FIG. 8 illustrates the spectrum of a mercury light source showing a significant portion of the UV light spectrum.

As seen by the diagram of FIG. 7, by injecting ultra violet radiation from source 60 into the exposed end of prism 24, ultra violet radiation (indicated as 63) is dispersed as the UV radiation propagates transversely through the prism and into the adhesive layer 55 (FIG. 6), causing frontal polymerization of the adhesive due to UV light propagating through the prism. In most instances, the UV radiation 63 from source 60 through prism 24 will, upon an exposure of about 20 seconds at a distance of about 2.5 cm between the source and the prism 24 result in sufficient UV curing of the adhesive to fix the prism holder to the lens 22. In addition to exposing the adhesive 55 through prism 24 utilizing a UV light source 60, an additional UV light source 61 can be employed to direct UV radiation 63 through the gap G2 between the lower annular end of prism holder 26 and the top annular surface of sleeve 12 with 40 second exposures for a total exposure of about 100 seconds of UV radiation to cure the adhesive in the annular area of gap G1 at the lower end of prism holder 26. The above method is used if a non-transparent material is used to make the prism holder 26. If the preferred glass prism holder 26 is used, then UV radiation may also be applied directly through the holder material.

After the UV curing, which tends to temporarily induce stresses typically of from 200 to 300 psi or higher in the subassembly, thermal cure stress release and curing is provided as described below. Before such curing, however, input and output signals may be monitored to assure that the insertion loss (IL) remains.

In addition, the UV from light source 61 can be rotated around the periphery of the subassembly during successive exposures. The UV light can be delivered also through slots or openings formed into the lateral sides of the prism holder 26 as described below.

The UV initiated cure induces initial stresses due to polymerization shrinkage. For a typically highly filled epoxy adhesive with a limited volume of shrinkage (on the order of 0.2%), the induced stress can be as high as 300 to 600 psi. The stresses induced by the UV curing, which fixes the alignment of the prism to the collimating lens 22, are relieved and the bonding adhesive 55 further cured during thermal curing of the assembly 10 in a conventional oven which is controlled to provide the stress relaxation and thermal cure cycles as illustrated in FIG. 10.

Figure 10:
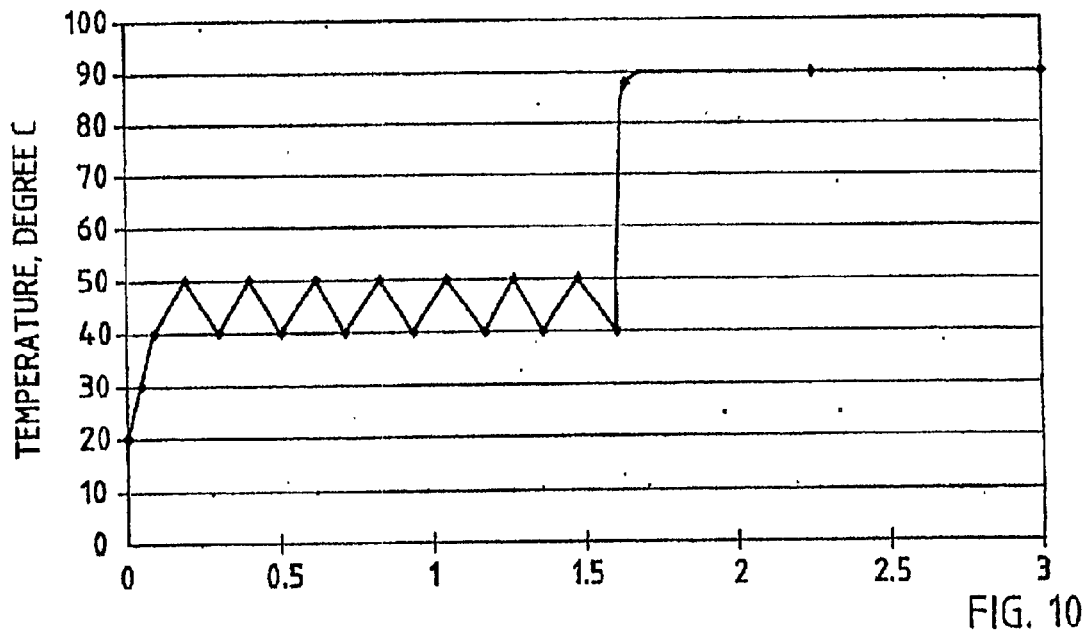
FIG. 10 is a graph of the accelerated dark cure and thermal cure of the subassembly shown in FIG. 6.

The graph of FIG. 10 illustrates an accelerated and thermally assisted stress relaxation phase in an oven which is controlled to provide several short thermal cycles at an elevated temperature preferably not exceeding 50% of the minimum temperature of thermal cure. The cycle typically starts at room temperature, and the temperature is increased to cycle between about 40° and about 60° C. over ten to fifteen cycles per hour for a total period of approximately one and one-half to four hours. The thermal cycling induces the variable mismatch stresses in the glass, metal prism holder (if used), and the adhesive. Although the rate of stress relaxation in the adhesive increases with an increase in the mismatch stresses, this stress level is limited by the allowable elastic limits. These cyclic changes in temperature induce the creep in adhesive that leads to the additionally accelerated stress relaxation. By cycling the temperature as shown in FIG. 10, the typically 12 to 24 hour room temperature dark cure is reduced to about one to two hours. In this case, any thermally induced repositioning of optical components (e.g. filters) is drastically reduced.

As seen in FIG. 10 after the thermally assisted stress relaxation phase (TASR), the assembly is subjected to a final thermal cure for about two to about two and one-half hours at a temperature of from about 85° to about 100° in the case of the preferred EMI-3410 adhesive. By utilizing the thermal curing cycle illustrated in FIG. 10, the elevated temperature induces a thermal mismatch stress in addition to the existing shrinkage stresses. When the combined stresses are less than the isochronous elastic limit of the adhesive material, the accelerated stress relaxation occurs with no irreversible deformation in the bond. This effect is substantially improved with increasing the number of thermal cycles during the TASR phase (i.e., initial) portion of the thermal cure cycle.

Figure 11:
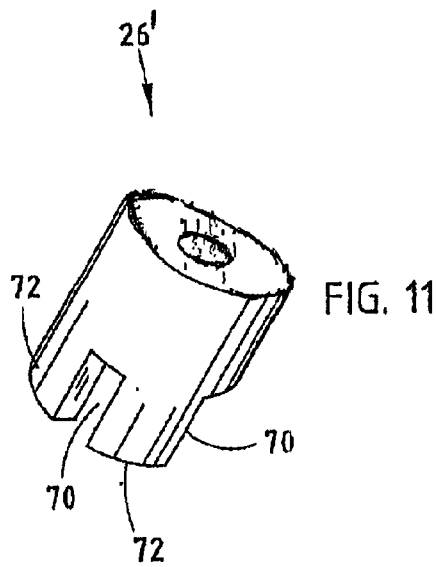
FIG. 11 is a perspective view of an alternative embodiment of a prism holder embodying one aspect of the present invention.
Figure 12:
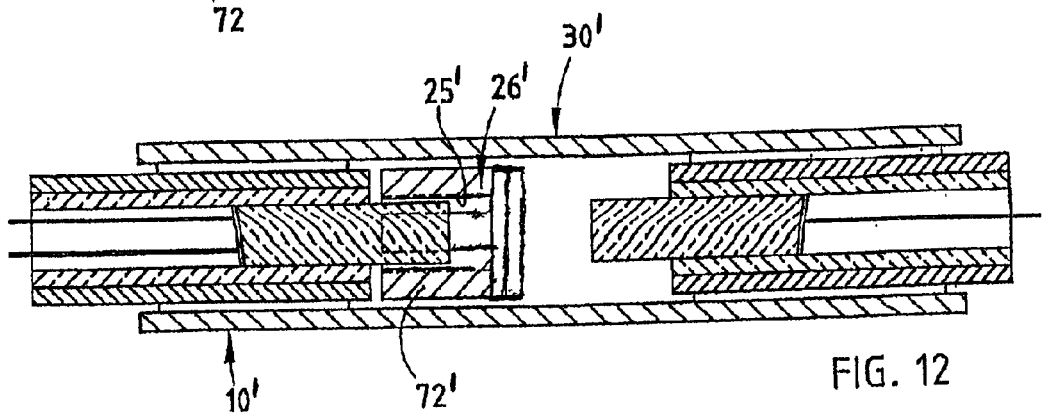
FIG. 12 is a vertical cross-sectional schematic view of a six-port combiner-splitter employing the prism holder shown in FIG. 11.

Although the utilization of the UV light source 60 directing radiation 63 through prism 24 provides the desired initial UV curing of the adhesive bond between the prism holder and collimating lens, the prism holder can be modified, as seen in FIGS. 11 and 12, to provide additional axial exposure ports for exposure by UV radiation from radial source 61 (as seen in FIG. 6) to improve the dispersion of UV radiation through the glass bonding adhesive layer 55.

As shown in FIG. 11, a prism holder 26' is shown, which is substantially identical to prism holder 26 with respect to the provision of a lower cylindrical aperture 25' for receiving the lens 22; however, the lower end of prism holder 26' includes a plurality of apertures such as longitudinally extending, radially inwardly projecting slots 70 spaced around the periphery of the prism holder and communicating with cylindrical opening 25' within the prism holder 26'. Four to six slots 70 have been found acceptable. The light source 61 is moved around the periphery of the prism holder 26' directing UV radiation into slots 70 defining downwardly projecting, spaced apart legs 72 between such slots such that UV radiation is dithered into the cylindrical side walls of lens 22 which serves to further disperse the UV radiation uniformly within the annular space containing bonding adhesive 55. By providing spaced radially extending elongated slots 70 or other suitably shaped apertures extending through the side wall of the lower section of prism holder 26' a light path is provided for UV radiation to the inner cylindrical aperture 25' receiving the end of lens 22. In one embodiment, four slots 70 spaced at 90° intervals around the lower section of holder 26' were provided. This results in improved uniform UV exposure to facilitate the UV curing of adhesive 55. In this embodiment, it is unnecessary to expose the bonding adhesive utilizing a light source 60 through the filter since the bonding adhesive is uniformly exposed utilizing radiation from light source 61. Once the subassembly 10', as shown in FIG. 12, is completed, it is assembled into the resultant six-port splitter package 30' in a conventional manner.

The above description is generally applicable to optical devices ranging from three-port devices to six-port devices, and to higher port devices. The difficulty of manufacturing operational devices increases with the increased number of optical fibers and ports. Discussed below are some of the features of the present invention which are directed to devices with six ports or more.

The uses and applications for six and eight-port embodiments of the invention are many. For example, possible configurations include six-port polarization splitters (as discussed above), polarization combiner-isolators, and polarization splitter-isolators that are formed by substituting a suitable block in place of prism 24. Similarly, an eight-port quad-isolator is created by using the invention to combine two quad-collimating assemblies coupled through a standard isolator core. Six-port devices are formed when a two-fiber ferrule and a four-fiber ferrule are coupled into a package. Similarly, eight-port devices are formed when two four-fiber ferrule assemblies are coupled into a package.

One important aspect of the inventive multiple-port device is the tolerance for the position of the optical fibers in the fiber ferrule 16. The core of an optical fiber has a diameter of only about 9.5 μm. Consequently, a 1 μm shift or error in the position of the fiber can cause the IL to be unacceptable. Therefore, great care must be taken to ensure the accuracy in the positioning of the fibers. To achieve the desired tolerances, the fibers should be pre-selected to satisfy a core concentricity within a tolerance of preferably about 1.0 μm, and more preferably about 0.5 μm, and most preferably about 0.1 μm; to satisfy a cladding diameter of 125 μm within a tolerance of preferably about 1.0 μm, and more preferably about 0.5 μm, and most preferably about 0.1 μm; and to satisfy an ovality tolerance of preferably less than about 0.8%, and more preferably about 0.4%, and most preferably about 0.12%. Core concentricity is the deviation of the center of the optical fiber core from the center of the fiber. Ovality is defined as the difference between the largest and smallest diameter of the fiber divided by the average diameter of the fiber (i.e. (D1−D2)*2/(D1+D2) where D1 and D2 are the largest and smallest diameter of the fiber). The pre-screening and selection of the fibers for one or more of these characteristics has yielded the unexpected result of providing an assembly in which the fibers and other component parts can be assembled and aligned in a manner that can be reliably repeated and manufactured for commercial applications. Prior to the realization of this unexpected result, there were no commercially available optical packages having greater than three ports, and no commercially available six or eight port packages. Regarding ferrule capillary tolerances, the simplest "square" capillary ferrule is preferably characterized by a tolerance of the output end of the capillary of 252 μm+/−2 μm as the distance between two parallel sides and more preferably 251 μm+/−1 μm and most preferably 250.5 μm+/−0.5 μm. Similar tolerances are preferred for the walls of other capillary shapes and configurations. Further, the tolerance of the fiber position must be maintained throughout the manufacturing, packaging, and environmental conditions the device must endure. The methods and apparatus to achieve these tolerances are a subject of the present invention and are discussed below.

Although some prior art devices may initially achieve the desired tolerances for the position of optical fibers, the prior art often fails when the device is subject to stresses, strains and environmental conditions that cause the fibers to shift sufficiently to exceed the tolerances. Causes of these stresses include: 1) viscous flow of adhesive involving the fibers, 2) curing of the adhesives that bond the fibers to the ferrule and, 3) thermal stress due to the final packaging operations or environmental testing conditions. During manufacture the devices are subject to heat such as from solder used to encase the devices in a protective metal sleeve 32. In use the devices are subject to environmental conditions and must remain operational over a qualification temperature range from −40° C. to 85° C. (an industry standard temperature range). Therefore, one aspect of the invention relates to a four-fiber-ferrule that satisfies the above mentioned tolerances.

Ferrules are generally cylindrical boro-silicate or fused silica components with one, two, three or more capillaries for receiving the optical fibers. The shape of the drawn capillaries and the illustrative fabricating techniques allow fibers to be not only symmetrically separated from the central axis of the ferrule, but also properly guided and constrained as well. This minimizes repositioning of the fibers caused by the adhesive flow and the thermally induced change in the separation distance between pairs of fibers.

The capillaries provide precision parallel positioning inside the ferrule and bonding of the fibers and thereby provide a reliable constraint of the fibers. Preferably, the fibers touch the nearest adjacent fiber or have a gap between the fibers of not more than about 0.5 μm. This helps to fix the position of the fibers. It is also preferred that the fibers do not twist around each other over the first 10 to 15 mm before the fibers enter the ferrule to reduce stress and/or fiber repositioning. An illustrative assembly process includes the following steps. The fibers are stripped of the protective coating and cleaned for a length of about 5 cm of the fiber end. The fibers are dipped into adhesive (e.g. Epo-Tek 353 ND). The stripped fiber ends are then fed through the capillary until the fiber coatings just reach into the cone end portion of the ferrule. Additional adhesive is applied to the fibers if needed and the adhesive is allowed to wick through the entire capillary. An adhesive such as 353 ND adhesive with viscosity (at room temperature) of about 3000 cPs (centipoise), or other suitable adhesive, can be used. The predicted gaps in the capillaries discussed herein correspond to this viscosity. A higher viscosity adhesive (5000 to 10000 cPs) may be used if the gaps are slightly larger. An increase in temperature when inserting the fibers inside the capillaries decreases the viscosity of the adhesive. Thus having various viscosities and temperatures it is possible to provide improved positioning of the fibers and minimize their repositioning after cure. In general, a suitable viscosity can be determined using the Hagen-Poiseuille equation modeling viscous flow in a capillary with optical fibers positioned in the capillary.

The subassembly is cured, an 8-degree angle is polished into the ferrule and anti-reflective coating is applied. The bond layers between the fibers and surrounding capillary wall are extremely thin (preferably less than about 1–1.5 μm) to minimize thermal stress and movement. Various embodiments of the ferrule capillaries of the present invention are illustrated in FIG. 13A to 13H and 14A to 14E.

Figure 13A:
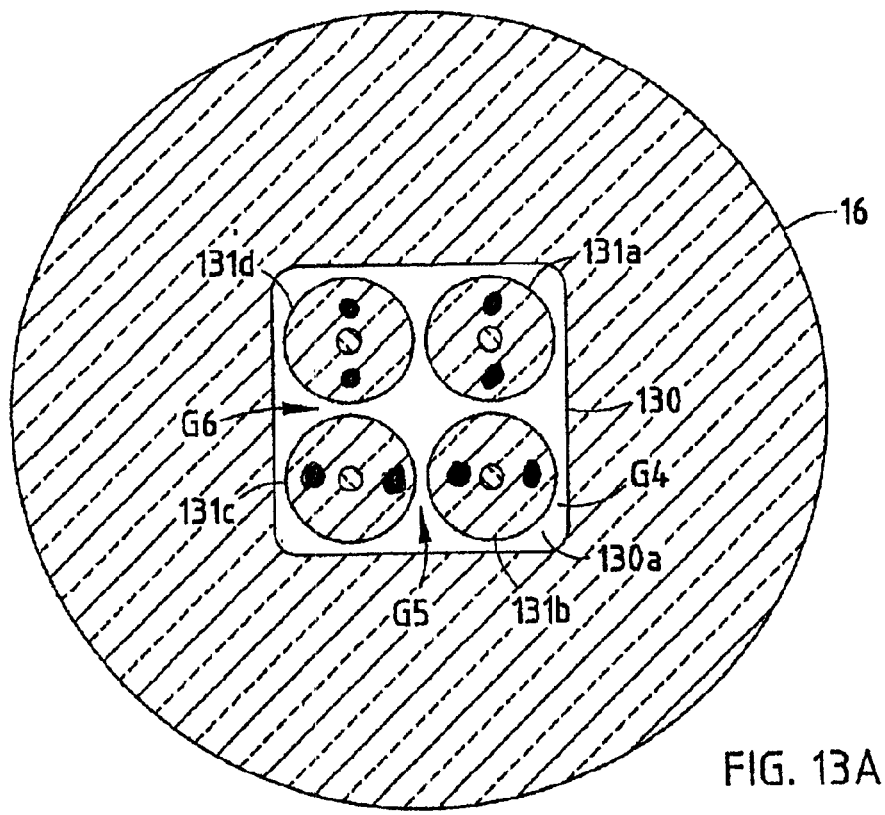
FIG. 13A is a cross-sectional view of a fiber-ferrule assembly illustrating a rounded square capillary.

FIG. 13A shows a cross sectional view of a ferrule 16 with a rounded square or rounded rectangular capillary 130 and closely packed optical fibers 131a, 131b, 131c, and 131d. Fibers 131 are illustrated as Panda polarization-maintaining fibers, however, the invention is also useful with other types of polarization-maintaining fibers and single-mode fibers in some embodiments. The rounded square capillary provides a fixed SD, while the rounded rectangle capillary (e.g. FIG. 13J) is used to achieve a variable SD. The rounded corners and closely packed fibers make this a good design for several reasons. The shape of the capillary 130 along with the closely spaced fibers 131 effectively prevents movement of the fibers 131 prior to curing and also reduces thermal stress on the fibers after curing. The curvature of rounded corners 130a preferably has a smaller radius than the outer surface of fibers 131. More preferably, the corners 130a are 90-degree angles and thus form a true square or rectangle capillary. Therefore, for purposes of this specification, "substantially rectangular" refers to a capillary cross section where the radius of the corners is less than or equal to the radius of the enclosed optical fibers. Gap G4 is where the fiber comes closest to touching, or actually touches, the wall of capillary 130. Gap G4 is preferably less than about 0.5 μm, and more preferably less than about 0.1 μm, and most preferably zero (i.e. the fiber touching the wall of the capillary). The gap G6 between the closely adjacent fibers 131a and 131b (and also fibers 131c and 131d) is similarly small (i.e. preferably less than about 1.0 μm, 0.5 μm, or zero μm). The gap G5 is also preferably small (i.e. less than about 1.0 μm, 0.5 μm, or zero μm) however, the gap G5 between the distant adjacent fibers 131a and 131d may be larger to achieve a desired SD as illustrated in the following figures. The closely packed fibers also provide a secondary advantage in that only a small amount of adhesive is required in the capillary 130 and therefore less thermal stress is exerted on the fibers 131 due to the unequal coefficient of thermal expansion (CTE) between the fibers and the adhesive. Even the adhesive in the larger gap G5 has been found to have minimal effect in causing stress or shifting of the optical fibers due to thermal expansion and contraction. This capillary design tends to prevent shifting of the fibers and prevents rotation of the fibers due to the flow of adhesive prior to cure (e.g. fiber 131d is unlikely to rotate to the position of fiber 131a, and fiber 131a is unlikely to rotate to position 131b, etc.).

Figure 15:
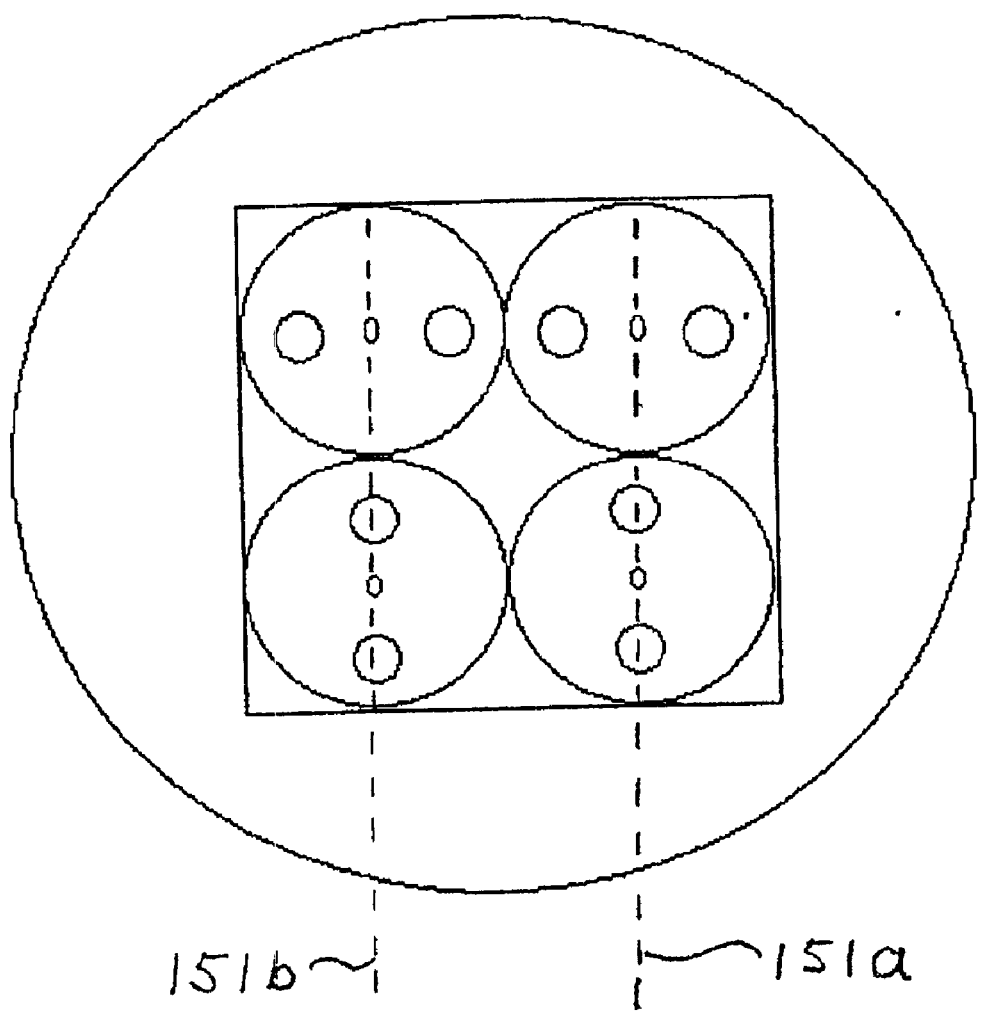
FIG. 15 illustrates the splitting plane defined by two optical fibers.
Figure 16:
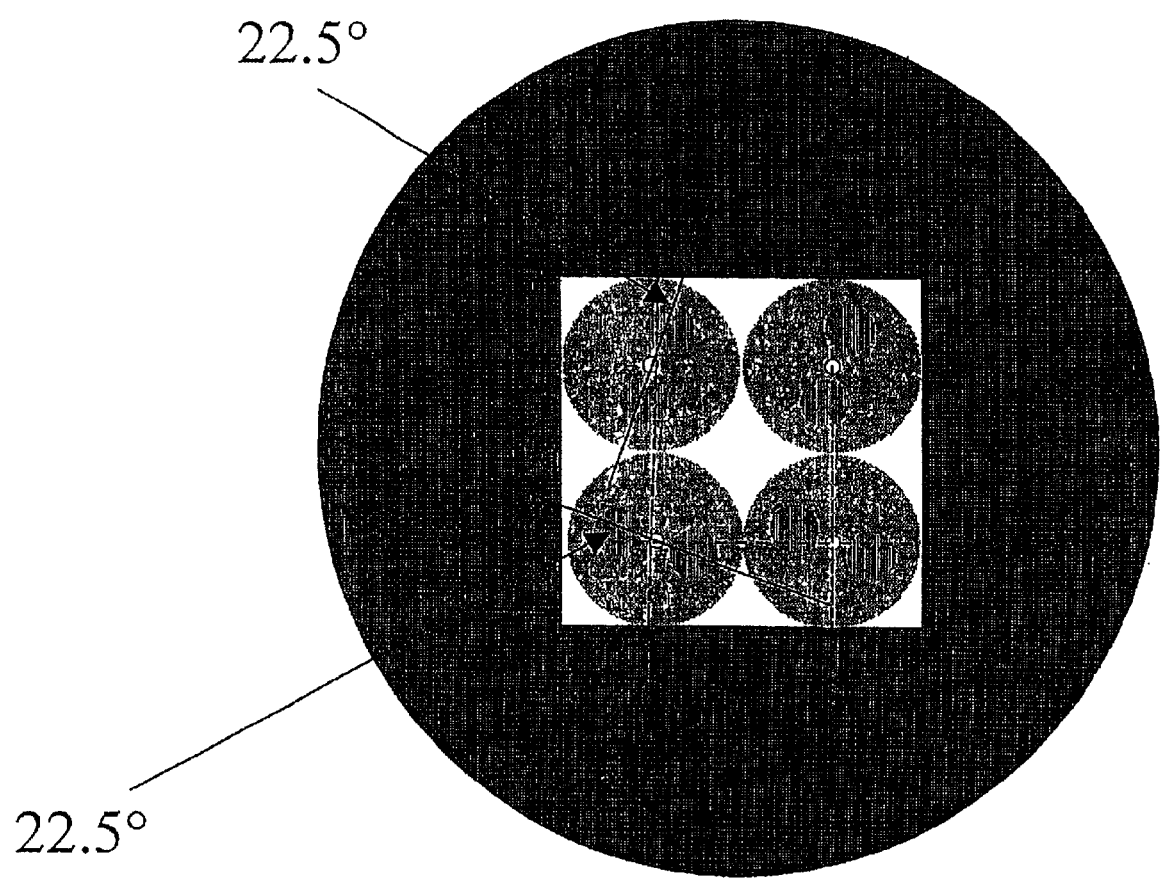
FIG. 16 illustrates the rotation of PM fibers to match an isolator block.

Generally, pairs of polarization-maintaining fibers comprise two fibers that have their direction of dominant stress rotated 90° relative to one another. This 90° relative positioning is preferably achieved within a tolerance of +/−3°, and more preferably within a tolerance of +/−2°, and most preferably within a tolerance of +/−10. Therefore, in FIG. 13A, fibers 131a and 131b form a pair and fibers 131c and 131d also form a pair. Also, it has been found that the polarization maintaining fibers should be positioned relative to their respective splitting planes. The splitting planes are illustrated in FIG. 15. Splitting planes 151a and 151b are defined by lines running through the center of the core of two optical fibers. As shown in FIG. 15, the fibers are arranged with their direction of dominant stress either parallel or perpendicular to the splitting planes 151. However, when a Faraday plate is part of the prism or block 24, then the fibers are rotated 22.5° to match the c-axis in the isolator block. This rotation is illustrated in FIG. 16. It was found that the splitting planes 151 are preferably parallel to within +/−2°, and more preferably within a tolerance of +/−1°, and most preferably within a tolerance of +/−0.5°. Several capillary configurations are possible and are discussed next.

Several other exemplary capillary designs include the butterfly capillary (FIG. 13B), the flower capillary (FIG. 13C), the six-fiber rectangular capillary (FIG. 13D), the two wafer-ferrule (FIG. 13E and 13F), the four-fiber rectangular capillary (FIG. 13J), the dual rectangular capillary (FIG. 13K), the variable dual rectangle capillary (FIG. 13L), the dual oval capillary (FIG. 13M), the mixed capillary (FIG. 13N) and the alignment washer design (FIGS. 14A & B). For simplicity, the same reference numbers are used for corresponding features in each of the Figures.

A significant difference between the capillary designs is that some are useful for a "fixed" separation distance design while others are useful for a "variable" separation distance design. For example, FIGS. 13A through 13D illustrate fixed SD designs (i.e. the SD cannot be changed). However, FIGS. 13E through 13H illustrate variable SD designs. Generally, the variable SD designs are used when larger separation distances are desired.

Figure 13B:
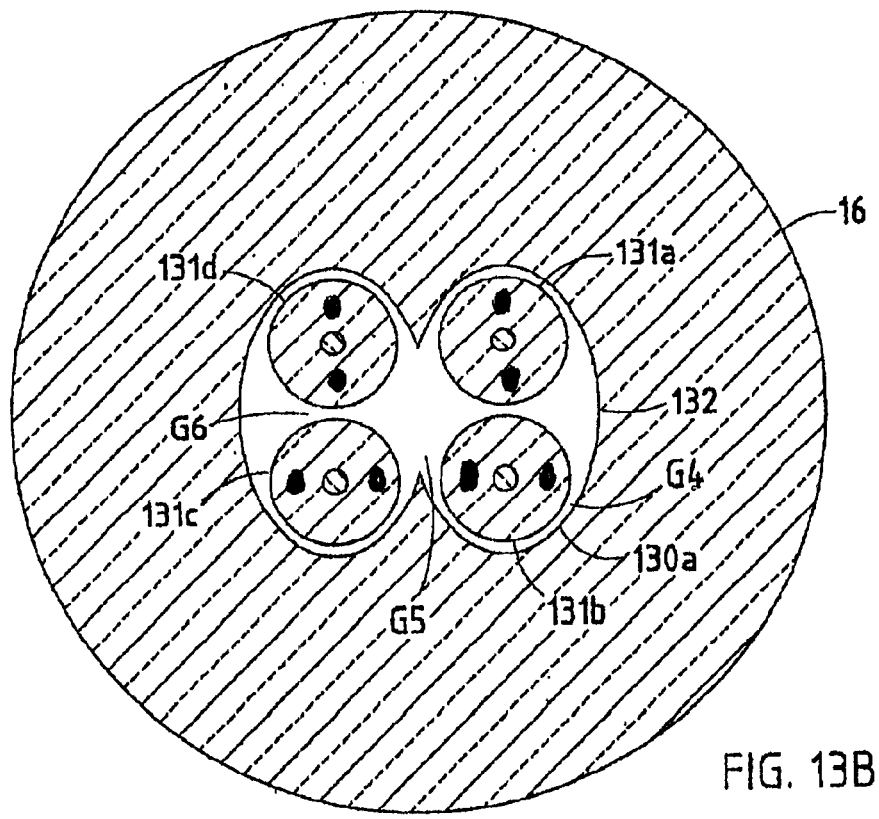
FIG. 13B is a cross-sectional view of a fiber-ferrule assembly illustrating a butterfly capillary.

Referring now to FIG. 13B, the shape of butterfly capillary 132 resembles two adjacent ovals and the capillary 132 encloses the optical fibers 131. Portions of capillary 132 form a constraining arc 132a of approximately 120° to 180° around fibers 131. The gap G4 between the surface of the fibers 131 and the proximate wall of the capillary 132 is preferably less than about 1.5 μm, and more preferably less then about 1.0 μm, and most preferably less than about 0.5 μm. Similarly, the gap between closely adjacent fibers G6 is also preferably less then about 1.5 μm, and more preferably less then 1.0 μm, and most preferably less then about 0.5 μm at the closest point. The gap G5 between the variably distant adjacent fibers G5 preferably ranges from 0.5 μm to about 300 μm depending on the position of the two oval capillaries. The fiber pairs for this configuration are preferably fibers 131a paired with 131b and 131c paired with 131d.

Figure 13C:
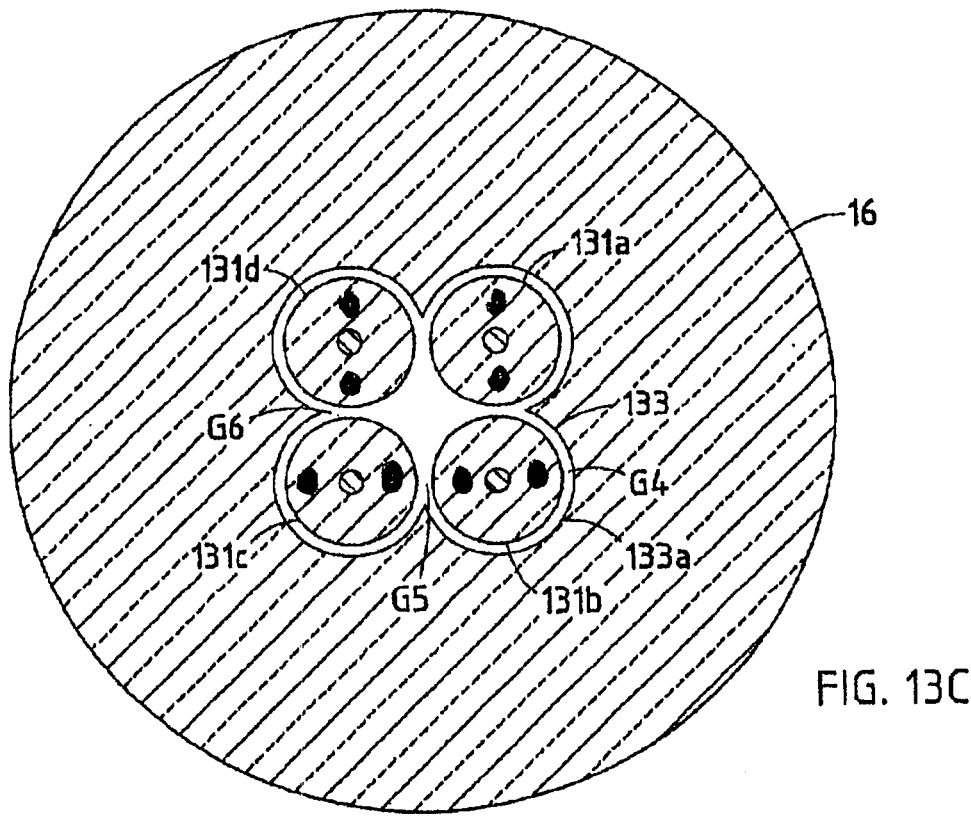
FIG. 13C is a cross-sectional view of a fiber-ferrule assembly illustrating a flower capillary.

FIG. 13C illustrates a flower capillary 133 enclosing fibers 131. Portions of capillary 133 form a constraining arc 133a of approximately 180° to 240° around fibers 131. The gap G4 between the fiber and the proximate wall of the capillary is preferably less than about 1.5 μm, and more preferably less then about 1.0 μm, and most preferably less than about 0.5 μm. Also, the gap G6 between closely adjacent fibers is similarly preferably less than about 1.5 μm, and more preferably less then about 1.0 μm, and most preferably less than about 0.5 μm.

Figure 13D:
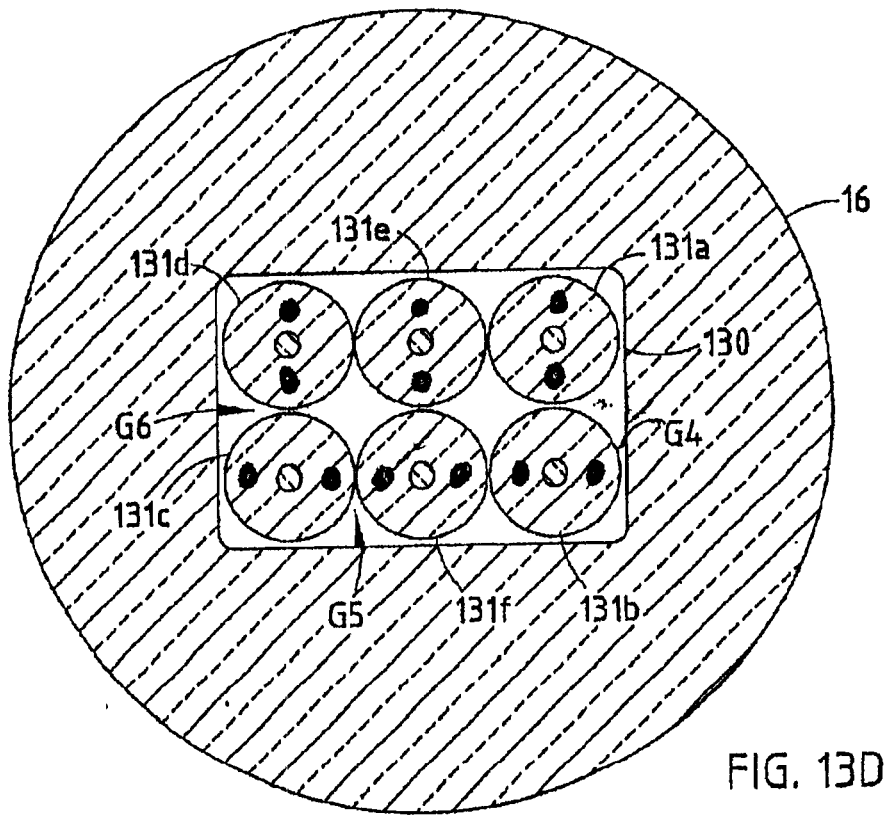
FIG. 13D is a cross-sectional view of a six-fiber ferrule having a rectangular capillary.

FIG. 13D illustrates a rectangular capillary 130 enclosing six fibers 131. Again, the gaps, G4, G5, and G6 are preferably as small as possible to prevent movement of the fibers. The gaps are therefore preferably less than about 1.5 μm, and more preferably less then about 1.0 μm, and most preferably less than about 0.5 μm. In this embodiment the fibers in the center (i.e. fibers 131e and 131f) may be used merely as spacers to hold the other fibers in place. In an alternate embodiment, the fibers in the center are used as a component in a device such as a nine-port triple polarization combiner or a twelve-port sextuple isolator. The fiber pairs (i.e. 131a, 131b and 131c, 131d) have precise separation distance between the pairs. The SD between fibers 131a and 131d are equal to the SD between fibers 131c and 131d to within a tolerance of preferably less than 1.0 μm.

The ferrule and capillary designs described above are examples of fixed separation distance capillaries. The separation distance between the pairs of fibers is fixed and cannot be easily changed. However, it is desirable to be able to change or vary the separation distance for some applications. For example, if the input single-mode fibers have a large SD (e.g., if a dual-capillary input ferrule is used), the it is useful to use these deigns to make the SD between the fiber pairs match the SD of the single-mode fibers. Also, if it is desired to match a particular prism's splitting angle, then it is useful to vary the separation distance between the fibers of each pair of fibers to match the desired splitting angle. The following ferrule and capillary designs provide a method of achieving the desired separation distance while maintaining the high positioning accuracy of the prior designs. Generally, these designs maintain a fixed vertical separation between fibers while varying the horizontal (as seen in the Figures) distance.

Figure 13E:
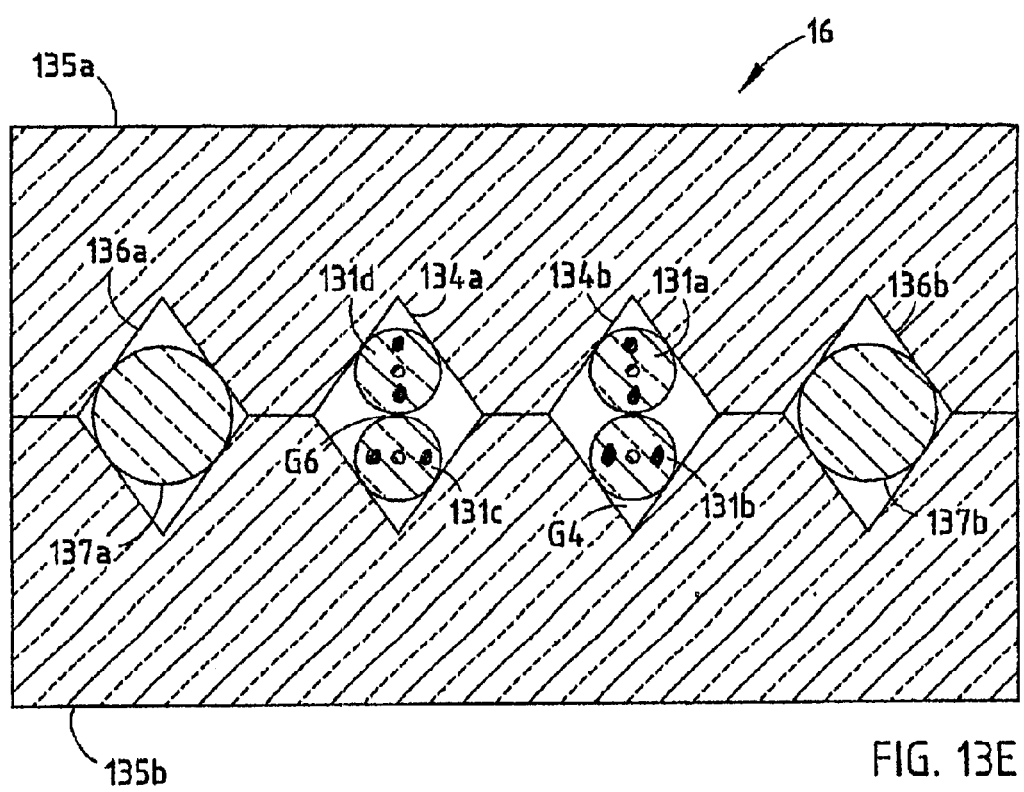
FIG. 13E is a cross-sectional view of a fiber-ferrule assembly illustrating capillaries formed by symmetrical grooves formed in dual silicon wafers.

One embodiment for a variable SD ferrule and capillary is illustrated in the two-wafer capillaries shown in FIG. 13E where a cross-sectional view of four fibers 131 (two pairs) are positioned inside of V-shaped capillaries 134a and 134b formed from matching grooves in two elongated silicon plates (wafers) 135a and 135b. The silicon wafers are etched with the V-grooves and accuracy of 0.5 μm is possible. Crystallographic orientation provides excellent angle reproducibility. Further, the wafers are easily mass produced using current etching techniques. The wafers 135 are each provided with four, preferably symmetrical, grooves. The two center grooves (i.e. fiber grooves) are used to form capillaries 134a and 134b when the wafers are mated together. A feature of this design is that the V-shaped grooves may be positioned as desired to achieve any required separation distance between the fibers 131. The adjacent fibers in each capillary 134 preferably touch each other. Adhesive is applied to the gaps to secure the fibers 131 in place. Alignment grooves in wafers form two alignment capillaries 136 which are for aligning the wafers 135.

Preferably, glass balls or rods 137 of about 300 μm diameter are inserted into alignment capillaries 136 of having dimensions of suitable size to contain rods 137 up to about 302 μm in diameter to maintain alignment. The rods 137 preferably have dimensional tolerance of 2.0 μm, and more preferably have a tolerance of 1.0 μm, and most preferably have a tolerance of 0.5 μm. If the rods are too large, the fibers may have excess room to move relative to their respective grooves. The glass rods, therefore, are preferably pre-screened to verify dimensional tolerances. UV-curable tacking adhesives and thermally curable structural adhesives are applied for providing structural integrity of the assembly. A more preferable wafer ferrule is illustrated in FIGS. 13F through 13H.

Figure 13F:
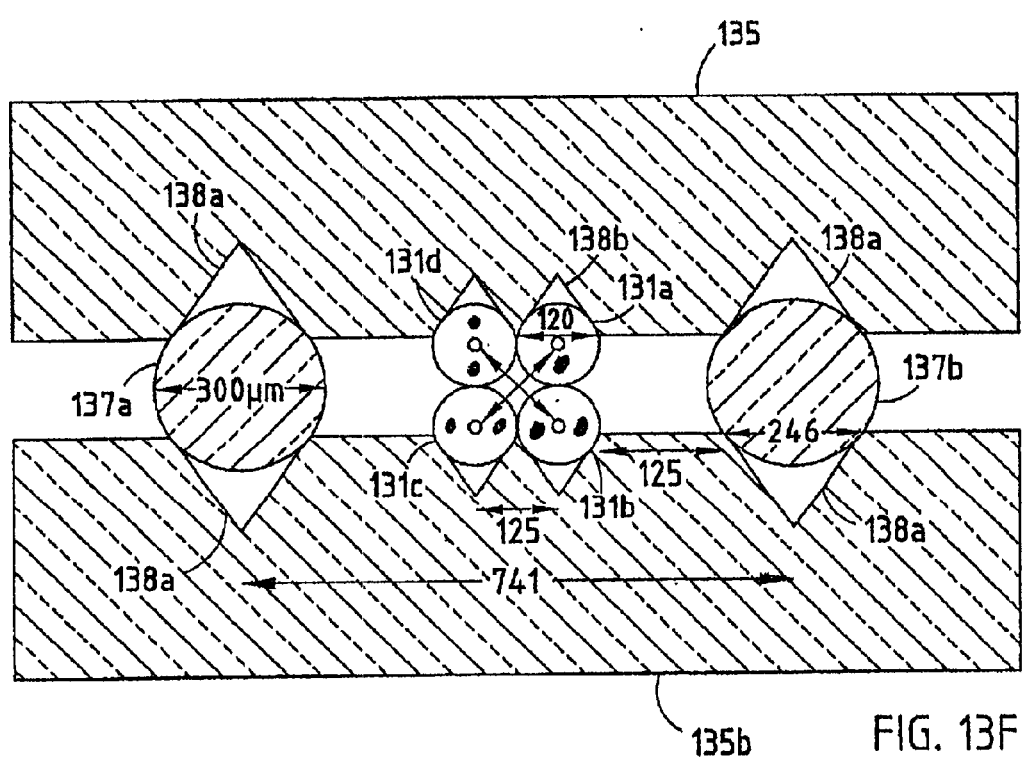
FIG. 13F is another embodiment of a fiber-ferrule formed from two wafers.
Figure 13G:
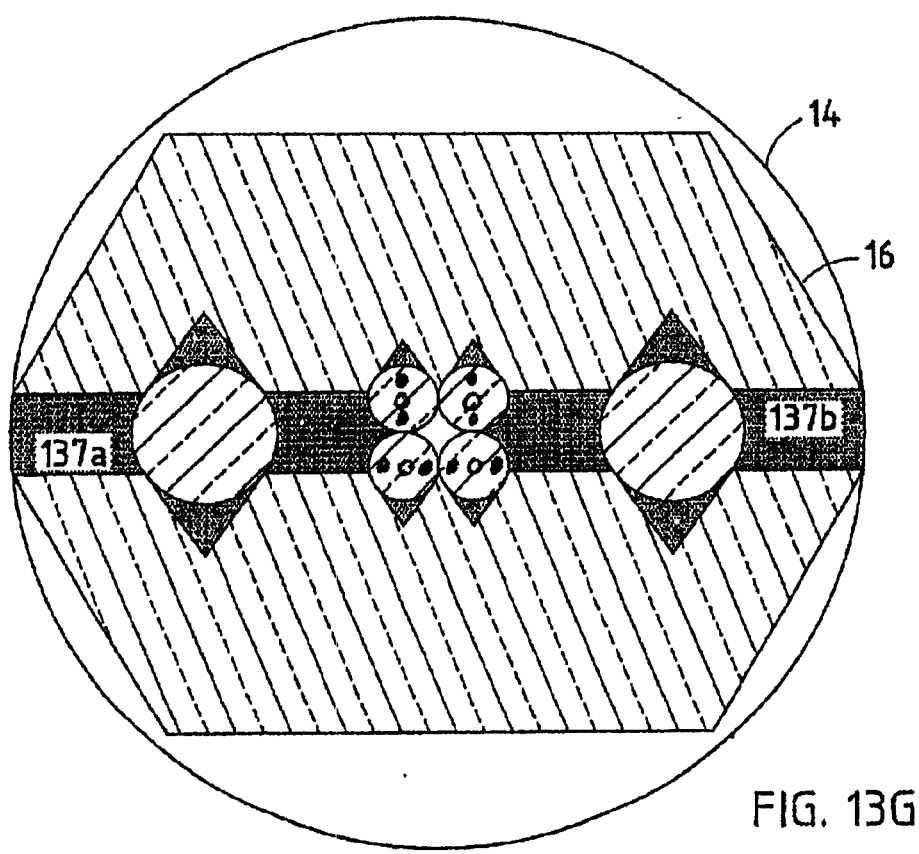
FIG. 13G is a cross-sectional schematic view of a finished two-wafer ferrule inside a glass sleeve.
Figure 13H:
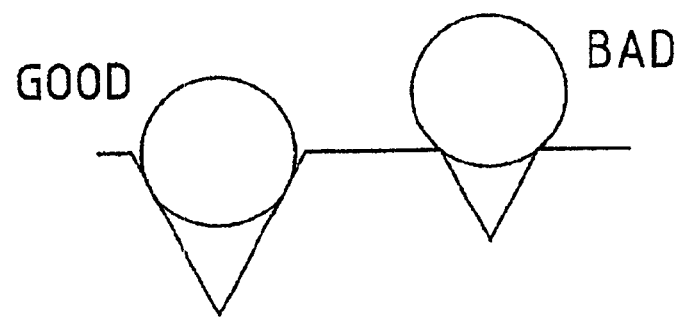
FIG. 13H illustrates the preferred V-groove and alignment rod configuration.

The wafers in FIG. 13F use smaller V-shaped grooves 138 for supporting the fibers 131 and alignment rods/pins 137. The smaller V-shaped grooves prevent the wafers from coming into contact. It is thought that this design will allow the fibers to touch adjacent fibers and thereby prevent movement or repositioning of the fibers 131. In this embodiment, the large V-shaped grooves (i.e. alignment grooves) 138a support the alignment pins 137 and the smaller V-shaped grooves (i.e. fiber grooves) 138b support the fibers 131. The large V-grooves 138a preferably are 246 μm at their widest point. The smaller V-grooves 138b are preferably 120 μm at their widest point. Using this design, the V-grooves that support the fibers 131 can be positioned as desired to vary the separation distance of the fibers 131. Using known etching techniques, the V-grooves can be positioned with a tolerance of about 0.2 μm. This design is easily expanded to more fibers by merely etching more matching V-grooves to form more capillaries for more fibers. Even though the wafers do not touch, the channels formed by the matching grooves are still referred to as capillaries for purposes of this specification.

The aligned and bonded wafer ferrule 16 are then cut, etched, or machined (e.g., polished) to a polygonal or cylindrical shape or other shape as desired so that ferrule may be inserted inside a protective glass sleeve 14. This is illustrated in FIG. 13G. The end-face surface is processed the same as other ferrules, the end-face is ground to an 8° angle, polished, and coated with an anti-reflective (AR) material. One skilled in the art will understand from these examples that there are other similar capillary designs which will similarly support the positioning of optical fibers with tolerances of about 0.5 μm.

Generally, over etching (i.e., excessive etching) of the V-grooves is not a problem. If the V-grooves are over etched, only a uniform vertical shift in the wafers is induced. Of course, if the V-grooves are etched too excessively, the fibers and alignment pins may have room to move or reposition. FIG. 13H illustrates the relative position of fibers and alignment pins and V-grooves. The V-groove on the left easily restrains the movement of the fiber. However, the V-groove on the right side provides very little restraint on the fiber and is therefore less desirable.

Figure 13I:
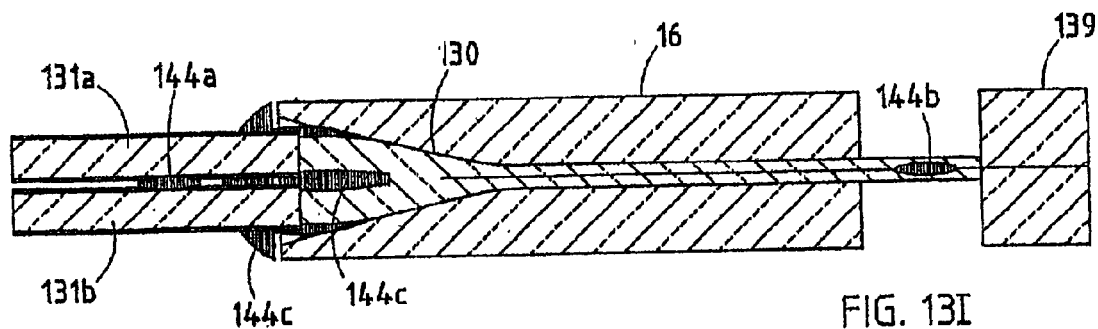
FIG. 13I is a cross-sectional view of a fiber ferrule illustrating alignment of fibers with two wafers and application of liquid adhesive.

While the wafer ferrule design has several advantages, the wafers and alignment rods are expensive to manufacture and the process of aligning the fibers properly into the V-grooves can be time consuming. A technique to reduce the disadvantages while still taking advantage of the high accuracy of the V-grooves will now be shown. Using this method, a conventional (i.e., prior art) ferrule and capillary may be used in combination with wafers to achieve a high degree of accuracy in positioning the fibers at a low cost. The process is as follows and is illustrated in FIG. 13I. A plurality of optical fibers 131 are inserted into a ferrule 16. The fibers 131 are sufficiently long to extend out the end of the ferrule 16. Two silicon wafers are etched with V-grooves in the same manner as discussed above. The two wafers 139 are positioned around the fibers 131 such that the fibers 131 are accurately positioned in the V-grooves as discussed above. The wafers 139 are clamped together with a spring clamp or similar device to temporarily secure the fibers. The fibers 131 are now accurately positioned and adhesive is applied to permanently hold the fibers in place. Using this technique, an inexpensive ferrule with a low tolerance capillary can be made to position fibers in a very high degree of accuracy which rivals the two-wafer designs discussed above.

The preferred method of applying adhesive to all capillaries includes applying small portions of adhesive 144a and 144b to the fibers 131 just outside of the ferrule 16 to block the flow of subsequently applied liquid adhesive. This adhesive is cured before applying additional adhesive. Additional adhesive 144c is applied to the fibers and the end of the ferrule 16 and allowed to wick through the capillary 130. The liquid adhesive is drawn through the capillary 130 presumably via the process of capillary action and emerges out the opposite end of the ferrule where it is blocked by cured adhesive 144b. The adhesive 144c is cured and the wafers 139 are removed. The fibers 131 and ferrule 16 may then be cut and polished as desired.

Another technique for applying adhesive is to apply the adhesive to the fibers prior to inserting the fibers into the ferrule. This technique has the advantage that the fibers are held together by the liquid adhesive by capillary action. The liquid adhesive may be applied by dipping the fibers into the adhesive, or preferably by applying a small amount of adhesive to the fibers.

Figure 13J:
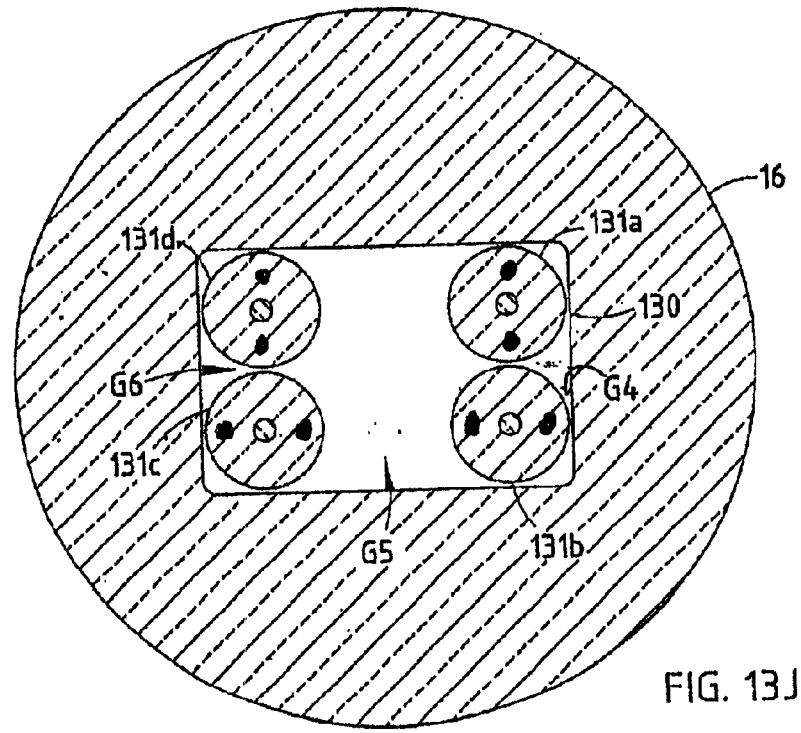
FIG. 13J is a cross-sectional view of a fiber ferrule having a rectangular capillary for variable separation distance.

Another design for achieving variable separation distance is illustrated in FIG. 13J. In this design a rectangular capillary 130 supports four fibers 131. The fibers are positioned against the walls of the capillary 130 and therefore the separation distance is controlled by the width of the capillary 130. The gaps, G4 and G6, are preferably less than about 1.5 $\mu$m, and more preferably less then about 1.0 $\mu$m, and most preferably less than about 0.5 $\mu$m. However, the horizontal gap G5 between fibers may be as wide as desired. In other words, gap G5 is the shortest or minimum distance between the cladding of adjacent fibers 131b and 131c.

Figure 13K:
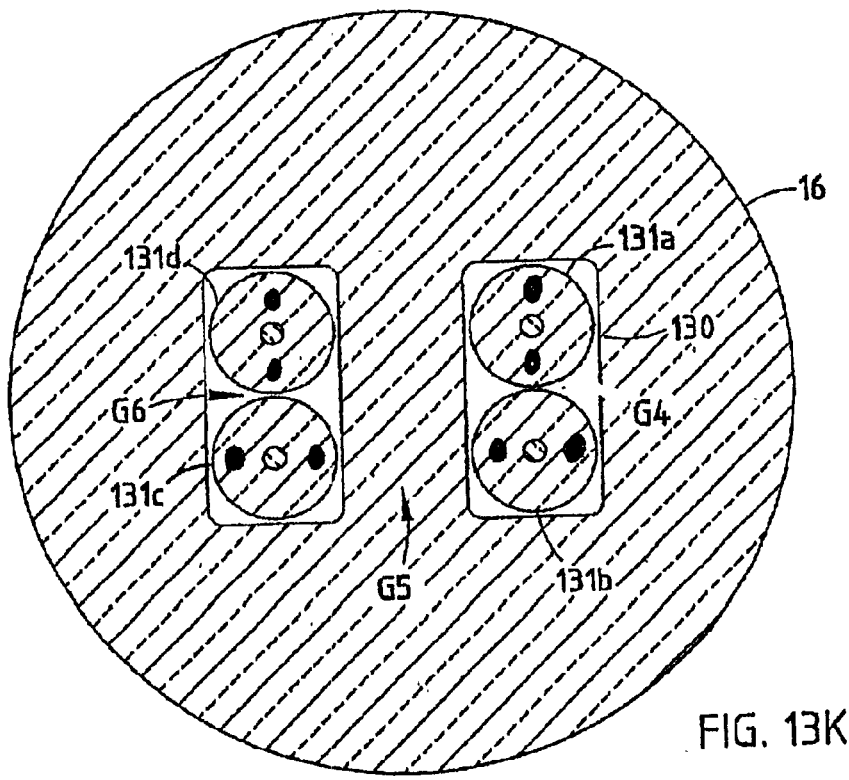
FIG. 13K is a cross-sectional view of a fiber ferrule having dual rectangular capillaries for variable separation distance.

Yet another design is the dual-rectangle capillary illustrated in FIG. 13K. The capillaries 130 may be manufactured to tolerances of less than 1.0 $\mu$m using currently known techniques and therefore the separation distance between the fiber pairs can be closely controlled. The preferred dimensions of the capillaries 130 are specified to be 2.0 $\mu$m wider and taller than the dimensions of the fibers 131. The preferred tolerance for the capillaries 130 is 2.0 $\mu$m. Therefore, there is room for inserting the fibers into the capillaries and while limiting the repositioning of the fibers.

Figure 13L:
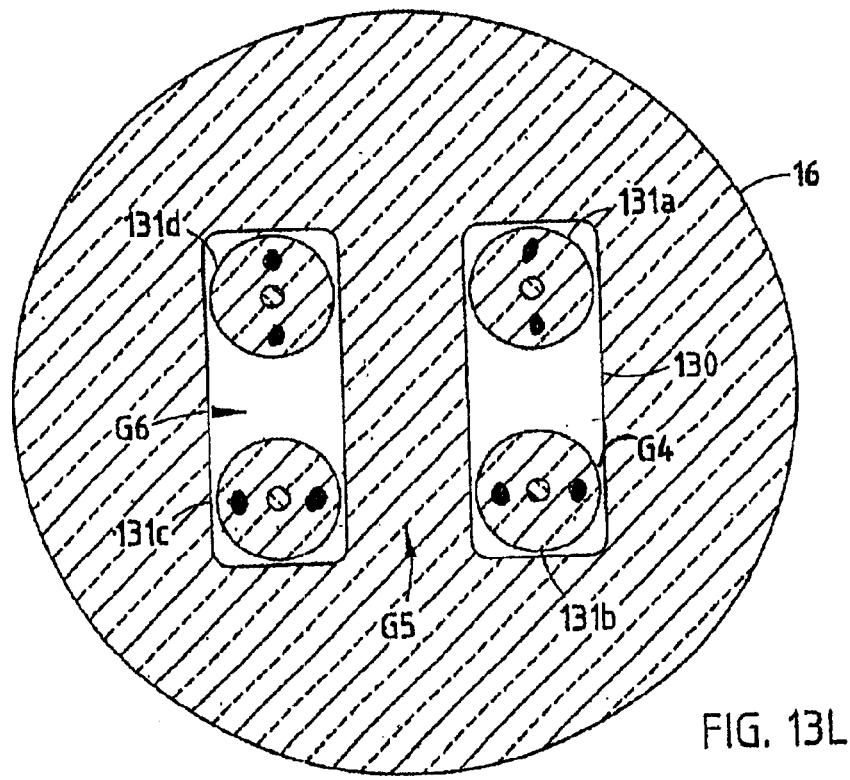
FIG. 13L is a cross-sectional view of a fiber ferrule having elongated dual rectangular capillaries.

Still yet another embodiment is illustrated in FIG. 13L. This embodiment allows variable positioning of the fibers 131 in both the horizontal and the vertical directions as seen in the figure. This embodiment is similar to FIG. 13K in both design and tolerances. Although the design in FIG. 13L can be used to achieve large separation distances between the fibers 131, the fibers can more easily be repositioned within the capillaries 130 due to stresses such as adhesive curing and thermal changes. It should be noted that some care must be taken to provide a reasonable separation between the capillaries 130. It has been found that thin portions between the capillaries lead to fractures and breaks in the glass between the capillaries. In this embodiment, gap G6 is the shortest or minimum distance between the surface of the cladding of the adjacent fibers 131c and 131d.

Figure 13M:
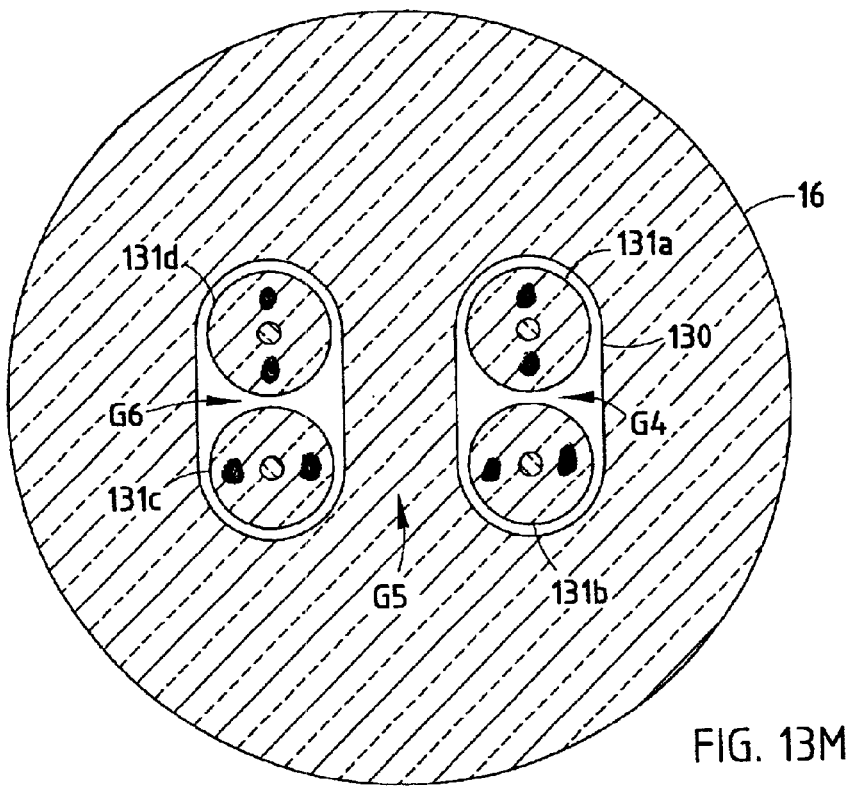
FIG. 13M is a cross-sectional view of a fiber ferrule having dual oval capillaries.

FIG. 13M illustrates another dual capillary design similar to the design of FIG. 13K. However, in this instance the capillaries are ovals instead of rectangles. The same fabrication techniques and tolerances apply to this embodiment.

Figure 13N:
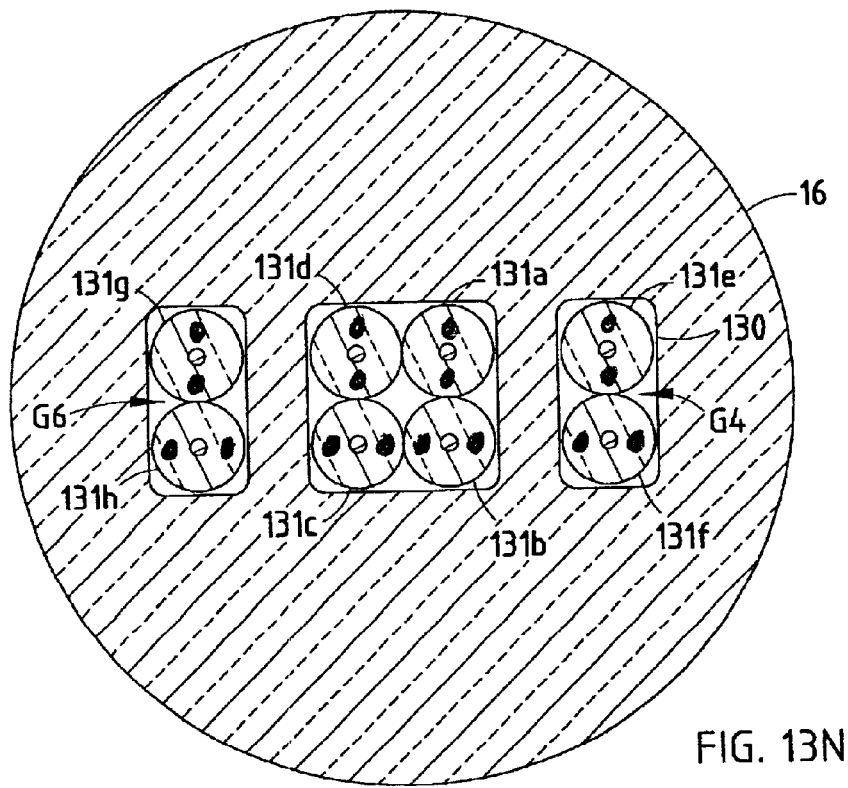
FIG. 13N is a cross-sectional view of a hybird fiber ferrule having both fixed and variable separation distance.

A hybrid of both fixed and variable separation distance fibers is illustrated in FIG. 13N. This hybrid design incorporates features of the various designs discussed above. An advantage of this design is the large number of fibers (for example, 8 as shown in the illustrated embodiment) that are fit into a single ferrule. However, the separation distance for the fibers is not equal. The four fibers 131a–131d in the middle capillary are packed closely together, while the outer fibers 131e and 131f are widely separated from fibers 131g and 131h. In this embodiment it is preferred pair for the optical fibers in this configuration would typically be: fiber 131a with 131b; fiber 131c with 131d; fiber 131e with 131f; and fiber 131g with 131h.

Yet another process and apparatus for positioning optical fibers inside of a ferrule uses alignment washers to precisely position the fibers. This process is illustrated in FIGS. 14A and B. The process uses alignment washers 140 shown in FIG. 14A. Washer 140 is shown having four apertures 141 for receiving optical fibers, however it is easily scalable to larger numbers of optical fibers. Alignment washer 140 allows precision fiber placement into a ferrule 16 using simple and highly manufacturable components. Photolithography technology may be used to manufacture the washers 140 with the precisely positioned apertures 141 and spacing between them. The diameter of apertures is preferably about 126 $\mu$m which provides approximately 0.5 $\mu$m gap between the fiber and the wall of the aperture. The tolerances for the location of the apertures are also preferably less than about 1.0 $\mu$m and more preferably less than about 0.5 $\mu$m for each pair of the fibers. For example, the tolerance for the distance "D4" between the apertures 141d and 141b is preferably 0.5 $\mu$m. The same is applicable to the distance "D5" between apertures 141a and 141c. Similarly, the tolerance for the distance "D6" between adjacent apertures such as 141a and 141b is preferably less than about 0.5 $\mu$m. A photo-resistive material is used to fabricate the washers 140. Any other technique may be used to form the washer as long as the necessary tolerances are achieved. The washers 140 are used as optical fiber-guiding and constraining devices. Using these methods generally results in restricting fiber movement, repositioning, or shifting to less than about 0.5 $\mu$m.

Turning to FIG. 14B there is shown a cross section view of the washers 140, fibers 142, and ferrule 16. Fibers 142 are inserted through first washer 140a, through ferrule 16, and through a second washer 140b. Ferrule 16 may have a conventional cylindrical capillary 130. However, the invention may be adapted for use with most capillaries regardless of shape. At this step of the process it may be helpful to pre-heat the assembly to aid in the installation and precise placement of the fibers 142. The assembly may then be cooled to room temperature to hold the fibers 142 in position while adhesive is applied. Washers 140 are bonded to the end-faces of ferrule 16. In the case of a ferrule having a cone portion for receiving fibers (see FIG. 5) the washer 140 is preferably bonded at the base of the cone portion where the capillary 130 meets the cone portion. The ferrule capillary 130 is filled with a liquid adhesive via the gap created by the flat portion 143 of washer 140 and either UV cured or thermally cured. The flat portion 143 may also be used to align the fibers at each end of the ferrule prior to curing the adhesive. When both flat portions are aligned then the fibers are also aligned. In an alternate embodiment, a single washer 143b is used to constrain the fibers at the end of the ferrule that faces the collimating lens. The completed assembly is processed the same as a conventional ferrule; the end-face is ground to approximately an 8° angle, polished, and an AR coating is applied. Fiber separation distance (SD) is discussed next.

For all of the fiber capillaries discussed above, it is important to achieve accurate SD so that the appropriate SD can be accurately matched with the SD of the fibers in the opposing end of the optical package. For example, in a six-port polarization combiner package the SD between the two single-mode fibers must match the SD between the two pairs of polarization maintaining fibers.

Another aspect of the invention is the relationship between the prism splitting angle and the optical fiber separation distance (SD) between the two fibers that form a pair of optical fibers. For example, as shown in FIG. 13L, the SD between fibers 131c and 131d is increased as needed to match the splitting angle of the prism 24. The tolerances for SD are precise so that light signals are directed to within about 0.5 μm of the center of a desired optical fiber core. It is helpful to define some terms prior to the general discussion SD.

Filter splitting angle for prisms is well known in the art and does not require lengthy explanation. Generally, the splitting angle can be specified to a desired angle. The preferred angle is one that will match the separation distance between two fibers that are very close or touching each other as shown in FIG. 13a.

Separation distance (SD) is defined, for purposes of this specification, as the distance between the center of the optical fiber cores of two optical fibers. The term generally refers to the distance between either pairs (e.g., the distance between the centers of fibers 131a and 131d in FIG. 13J) or the distance between fibers that form a pair (e.g., the distance between the centers of fibers 131d and 131c in FIG. 13J). In the preferred embodiment of the invention the SD range is about 125 μm, but some embodiments may use SD of about 250 μm or more.

It has been found that a precise, cost effective and stable alignment of a prism assembly 10 can be achieved by selecting components having matching characteristics. For example, the components of prism assembly 10 include the single-mode fiber ferrule 16, collimating lens 22, and prism 24. The characteristics, which need to be matched, include the prism splitting angle matching the SD between the fibers in a pair of fibers and the SD between the single-mode fibers and the SD between the fiber pairs (e.g., SD between 131a and 131d).

Once the matching output collimating assembly (e.g., 4-port polarization maintaining collimating assembly) 35', input collimating assembly 35, and the prism 24 are selected, the input collimating assembly 35 and the prism 24 are assembled as discussed above to form a prism assembly 10. The prism assembly 10 and four-fiber output collimating assembly 35' are aligned for a maximum transmitted signal and then soldered in place inside the outer sleeve 32 (FIG. 3) precisely retaining the interrelationships between these collimating assemblies. It should be noted that the prism and prism holder 26 may be mounted on either collimating assembly. The assembly of the complete six-port device 30 is discussed next.

Prism assembly 10 and output collimating assembly 35' are aligned and affixed inside protective sleeve 32. Input collimating assembly 35 is manufactured in nearly the same way as output collimating assembly 35'. However, depending on the application, fewer of the fiber pigtails 18 may be needed. For example, in a six-port polarization splitter application, only two fibers are needed in input collimating assembly 35. However, in an eight-port isolator application, four fibers are needed in the input collimating assembly 35. Also, it is preferred to use an aspheric collimating lens instead of a GRIN lens in the output collimating assembly 35'. Aspheric lenses have advantages in application using 6 port and higher port devices as compared to GRIN lenses. First, aspheric lenses have a long working distance, defined as distance from the front focal point to the front surface of the lens. It is also preferred that the aspheric lens be molded from a material with a low stress birefringence. For multiple-port devices, the input and output collimating assemblies preferably have focal points that match in order to minimize the insertion loss as known in the art. Aspheric lenses have working distance on the order of 2 mm which allows prism thickness of about 1.5 mm (and larger) to be used. Therefore, a preferred configuration includes a dual-fiber ferrule, an aspheric lens, a prism, another aspheric lens, and a quad-fiber ferrule.

Preferably, the input collimating assembly 35 is manufactured in the same way and to the same tolerances as the output collimating assembly 35'. This is preferred so that the location and SD of input optical fibers 18 will match with the corresponding output fibers 38. After the prism assembly 10 is bonded to the interior of sleeve 32, the output collimating assembly 35' is optically aligned with prism 24 by micro-tilting, rotating, and axially adjusting the output collimating assembly 35' for maximum transmission. Micro-tilting is possible because the interior dimension of protective sleeve 32 is substantially larger than the exterior dimensions of output collimating assembly 35'. Micro-tilting may be achieved by a micro-tilting device grasping both the protective sleeve 32 and the end of the output collimating assembly 35' that extends from the protective sleeve 32. The preferred embodiment provides a gap of about 50–100 μm between the exterior of the collimating assembly (i.e. the exterior of metal sleeve 37) and the interior of protective sleeve 32 which is sufficient to permit micro-tilting of output assembly 35' inside of sleeve 32. Once the active alignment of output collimating assembly 35' is complete, output collimating assembly 35' is affixed using a solder or adhesive 33 which is inserted into the gap between the exterior of collimating assembly 35' and the protective sleeve 32.

The dual polarization combiner-splitter described above is used as two separate and independent polarizing beam combiners or splitters. For example, it may function as two independent polarization beam combiners. Alternatively, either one or both of the optical paths can function as a polarization beam splitter. Since the two optical paths are independent, each can be used with different source wavelengths.

The previous discussion has related to how to manufacture six-port packages comprising four-fiber ferrules. It was also discussed that the invention is applicable to various multi-port packages and devices such as 8-port packages, 9-port packages, and 12-port packages. The following discussion relates to further applications of these devices and additional advantages of the invention.

Figure 17:
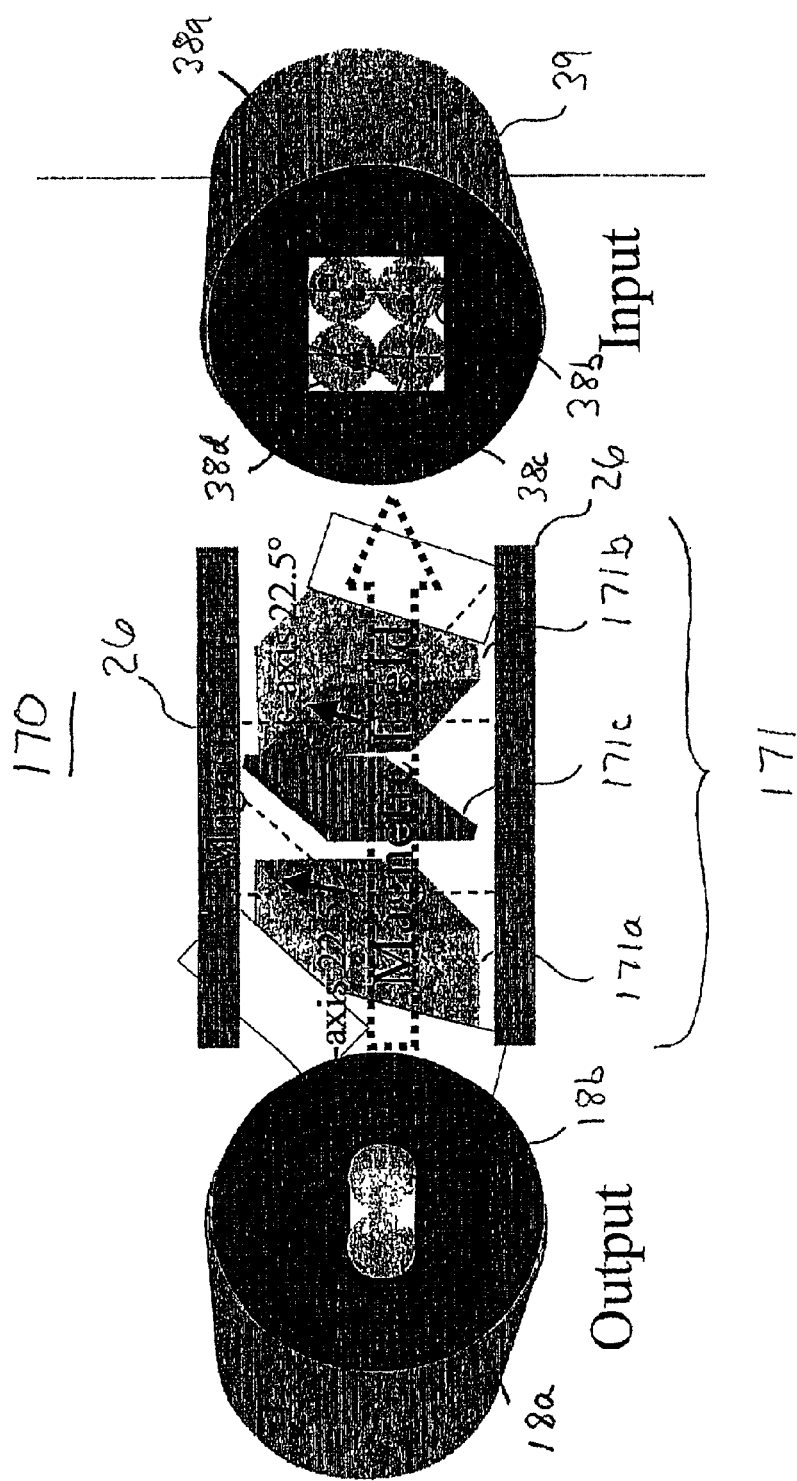
FIG. 17 is an exploded schematic view of polarization combiner-isolator components.

Turning first to FIG. 17 there is shown an exploded schematic view of the principle components of a six-port dual polarization combiner-isolator 170. The components comprise a four fiber ferrule 39 with polarization-maintaining fibers 38 orientated as discussed above. The four polarized light signals from fibers 38 are combined by the combiner block 171 into two signals by via birefringent wedges 171a and 171b in a conventional manner. The two signals are directed to single-mode fibers 18 enclosed in ferrule 16. The signals from PM fibers 39a and 39b are combined and directed to SM fiber 18b, while the signals from PM fibers 39d and 39c are combined and directed to SM fiber 18a. The rotation of any light signals traveling in the opposite direction are disbursed by the combined effects of wedges 171a and 171b, Faraday plate 171c, and magnetic holder 26.

One application for this combiner-isolator package 170 is in a Raman amplifier. In such an application, four pump lasers are input via the four PM fibers 38. Each pump laser is polarized, and the PM fibers oriented with respect to the crystal axis of the combiner-isolator block 171. The four laser beams are combined such that two beams are directed to SM fiber 18a and the other two beams are directed to SM fiber 18b.

Figure 18:
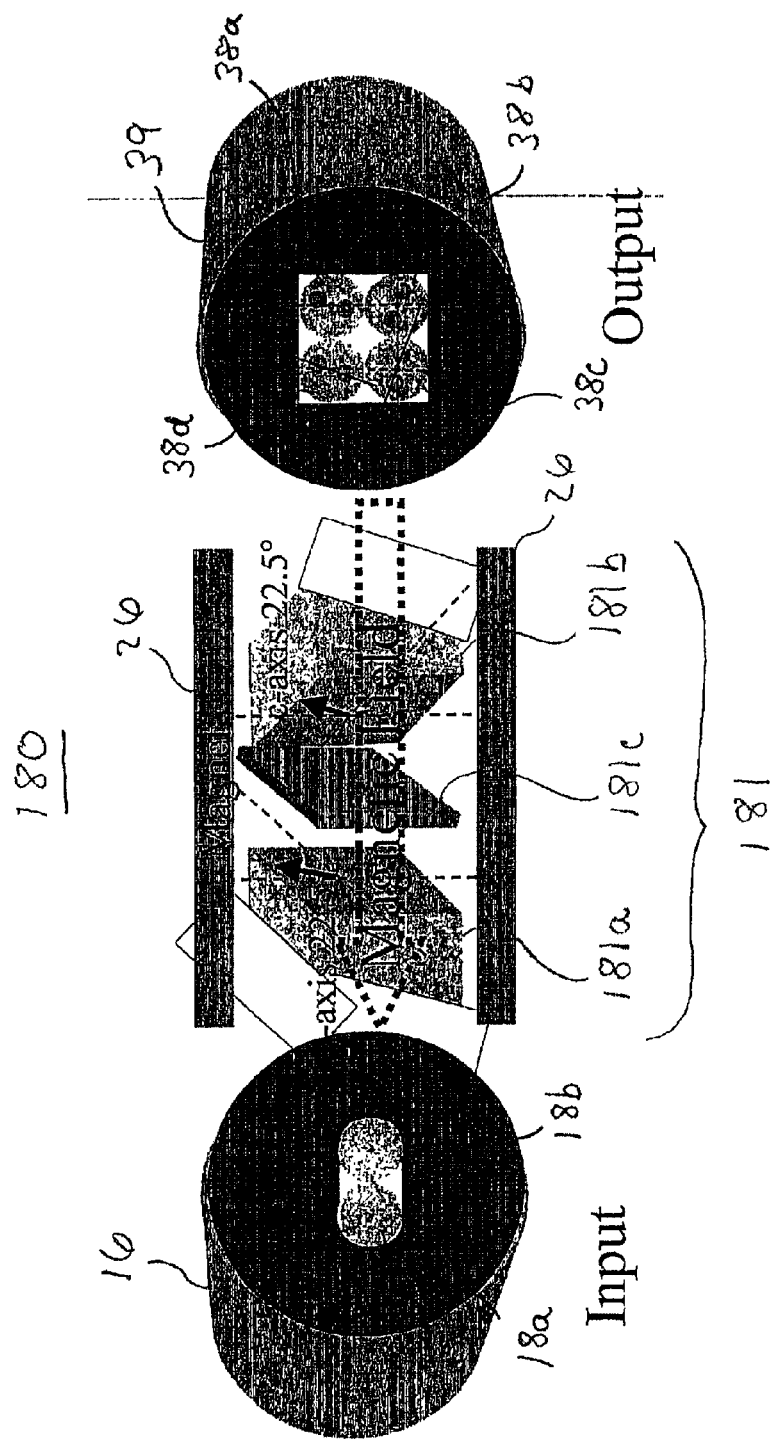
FIG. 18 is an exploded schematic view of polarization splitter-isolator components.

Turning next to FIG. 18 there is shown an exploded schematic view of the principle components of a six-port dual polarization splitter-isolator 180. The components are similar to those in FIG. 17 but with a splitter-isolator block 181 in place of the combiner-isolator block 171. The light signal input via SM fiber 18b is split into two orthogonal polarized beams and directed to PM fibers 38a and 38b. Similarly, the light signal input via SM fiber 18a is split into two polarized beams and directed to PM fibers 38d and 38c. Light signals traveling in the opposite direction are disbursed by the action of the wedges 181a and 181b and the Faraday plate 181c.

Figure 19:
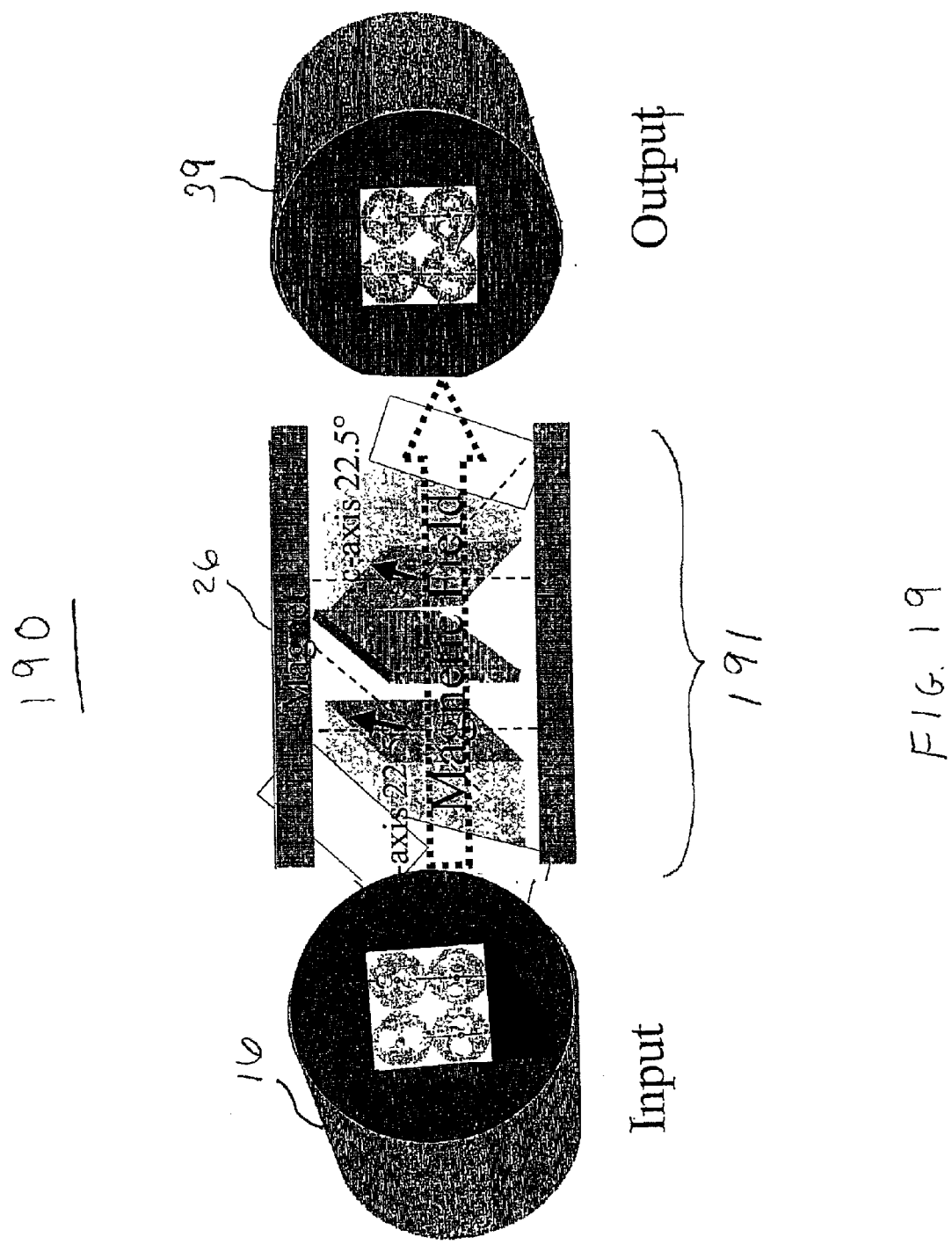
FIG. 19 is an exploded schematic view of isolator package components.

Yet another embodiment is shown in FIG. 19 where an 8-port isolator 190 is shown. The input ferrule 16 encloses four fibers 192. Four light signals are input via the four fibers 192 and are transmitted through isolator 191 to the four output fibers 193. If a light signal travels in the reverse direction, isolator block 191 disburses it. The fibers used in the isolator 190 may be either PM fiber or SM fiber.

It is envisioned that this invention is adaptable to function with most any type of combiner-splitter block, combiner-isolator block, splitter-isolator block, or isolator block.

It will become apparent to those skilled in the art that various modifications to the preferred embodiment of the invention as described herein can be made without departing from the spirit or scope of the invention as defined by the appended claims.

The invention claimed is:

1. An optical package comprising:
   a first ferrule having a capillary extending axially through said ferrule, said capillary satisfying a predetermined tolerance for the dimensions of said capillary;
   at least two single mode optical fibers extending through said capillary;
   a second ferrule having a second capillary extending axially through said second ferrule and satisfying a predetermined tolerance for the dimensions of said second capillary; and
   at least four optical polarization maintaining fibers optically coupled to said single mode optical fibers, said polarization maintaining fibers positioned inside of said second capillary, said polarization maintaining fibers satisfying predetermined tolerances.

2. The optical package of claim 1 wherein said single mode optical fibers comprise a first single mode optical fiber and a second single mode optical fiber, and wherein said polarization maintaining fibers comprise a first and a second pair of polarization maintaining fibers and wherein said first single mode optical fiber is optically coupled to said first pair of polarization maintaining fibers and said second single mode optical fiber is optically coupled to said second pair of polarization maintaining fibers.

3. The optical package of claim 2 wherein splitting planes of said first and second pair of polarization maintaining fibers are substantially parallel.

4. The optical package of claim 3 wherein the splitting planes of said first and second pair of polarization maintaining fibers are parallel within a tolerance of two degrees.

5. The optical package of claim 2 wherein the configuration of said second capillary is selected from the group consisting of a rounded square, a rounded rectangle, a butterfly, a flower, a two-wafer type formed from two wafers comprising matching grooves which form capillaries when the wafers are aligned, and a capillary comprising at least one alignment washer.

6. The optical package of claim 5 wherein the configuration of said first capillary is selected from the group consisting of a rounded rectangle, an oval, dual capillaries, a two-wafer capillary, and a capillary comprising at least one alignment washer.

7. The optical package of claim 2 wherein the single mode optical fibers define a first separation distance and the two pairs of polarization maintaining fibers define a second separation distance and wherein the separation distances are equal within a tolerance of 1.0 $\mu$m.

8. The optical package of claim 7 wherein the separation distances are equal within a tolerance of 0.5 $\mu$m.

9. The optical package of claim 2, wherein the tolerance for the walls of said capillaries is less than about +/−2.0 $\mu$m.

10. The optical package of claim 9, wherein the tolerance of said capillaries is less than about +/−1.0 $\mu$m.

11. The optical package of claim 10, wherein the tolerance of said capillaries is less than about +/−0.5 $\mu$m.

12. The optical package of claim 2 wherein the tolerances for said polarization maintaining fibers are selected from the group consisting of core concentricity, diameter, and ovality.

13. The optical package of claim 12 wherein the tolerance for said core concentricity is 1.0 $\mu$m, the tolerance for the diameter is 1.0 $\mu$m, and the tolerance for the ovality is 0.8 percent.

14. The optical package of claim 13, wherein the tolerance for said core concentricity is 0.5 $\mu$m, the tolerance for diameter is 0.5 $\mu$m, and the tolerance for ovality is 0.4 percent.

15. The optical package of claim 14, wherein the tolerance for said core concentricity is 0.1 $\mu$m, the tolerance for diameter is 0.1 $\mu$m, and the tolerance for ovality is 0.12 percent.

16. The optical package of claim 2 wherein the tolerances for said single mode fibers is selected from the group consisting of core concentricity, diameter, and ovality.

17. The optical package of claim 16 wherein the tolerance for said core concentricity is 1.0 $\mu$m, the tolerance for the diameter is 1.0 $\mu$m, and the tolerance for ovality is 0.8 percent.

18. The optical package of claim 17, wherein the tolerance for said core concentricity is 0.5 $\mu$m, the tolerance for diameter is 0.5 $\mu$m, and the tolerance for ovality is 0.4 percent.

19. The optical package of claim 18, wherein the tolerance for said core concentricity is 0.1 $\mu$m, the tolerance for diameter is 0.1 $\mu$m, and the tolerance for ovality is 0.12 percent.

20. The optical package of claim 1 further comprising a birefringent block positioned between said single mode optical fibers and said polarization maintaining fibers such that light passing between the single mode optical fibers and the polarization maintaining fibers pass through said birefringent block.

21. The optical package of claim 20 wherein said birefringent block is selected from the group consisting of a prism, a combiner-isolator block, a splitter-isolator block, an isolator block.

22. The optical package of claim 21 wherein said birefringent block is a Wollaston prism.

23. The optical package of claim 22 wherein the birefringent block comprises two birefringent wedged crystals and Faraday rotator plate positioned between the wedged crystals.

24. A method of manufacturing an optical package comprising the steps of:
providing two single-mode fibers satisfying predetermined tolerances;
providing a first ferrule comprising at least one capillary extending through said ferrule, said at least one capillary satisfying predetermined tolerances;
inserting said fibers into said at least one capillary;
providing two pairs of polarization-maintaining fibers satisfying predetermined tolerances;
providing a second ferrule comprising a second capillary extending through said ferrule, said second capillary in said second ferrule satisfying predetermined tolerances;
inserting said polarization-maintaining fibers into said second capillary; and
optically aligning at least one of said single-mode fibers with a pair of said polarization-maintaining fibers.

25. The method of claim 24 wherein the configuration of said second capillary is selected from the group consisting of a rounded square, a rounded rectangle, a butterfly, a flower, a two-wafer type formed from two wafers comprising matching grooves which form capillaries when the wafers are aligned, and a capillary comprising at least one alignment washer.

26. The method of claim 24 wherein the configuration of said first capillary is selected from the group consisting of a rounded rectangle, an oval, dual capillaries, a two-wafer capillary, and a capillary comprising at least one alignment washer.

27. The method of claim 24 wherein the single-mode fibers define a first separation distance and the two pairs of polarization maintaining fibers define a second separation distance and wherein the separation distances are equal within a tolerance of 1.0 $\mu$m.

28. The method of claim 27 wherein the separation distances are equal within a tolerance of 0.5 $\mu$m.

29. The method of claim 24, wherein the tolerance of said capillaries is less than about +/−2.0 $\mu$m.

30. The method of claim 29 wherein the tolerance of said capillaries is less than about +/−1.0 $\mu$m.

31. The method of claim 30 wherein the tolerance of said capillaries is less than about +/−0.5 $\mu$m.

32. The method of claim 24 wherein the tolerances for said polarization-maintaining fibers are selected from the group consisting of core concentricity, diameter, and ovality.

33. The method of claim 32 wherein the tolerance for said core concentricity is 1.0 $\mu$m, the tolerance for the diameter is 1.0 $\mu$m, and the tolerance for ovality is 0.8 percent.

34. The method of claim 32 wherein the tolerance for said core concentricity is 0.5 $\mu$m, the tolerance for diameter is 0.5 $\mu$m, and the tolerance for ovality is 0.4 percent.

35. The method of claim 32, wherein the tolerance for said core concentricity is 0.1 $\mu$m, the tolerance for diameter is 0.1 $\mu$m, and the tolerance for ovality is 0.12 percent.

36. The method of claim 24 wherein the tolerances for said single-mode fibers is selected from the group consisting of core concentricity, diameter, and ovality.

37. The method of claim 36 wherein the tolerance for said core concentricity is 1.0 $\mu$m, the tolerance for the diameter is 1.0 $\mu$m, and the tolerance for ovality is 0.8 percent.

38. The method of claim 36 wherein the tolerance for said core concentricity is 0.5 $\mu$m, the tolerance for diameter is 0.5 $\mu$m, and the tolerance for ovality is 0.4 percent.

39. The method of claim 36 wherein the tolerance for said core concentricity is 0.1 $\mu$m, the tolerance for diameter is 0.1 $\mu$m, and the tolerance for ovality is 0.12 percent.

40. The method of claim 24 further comprising a prism positioned between said single-mode fibers and said polarization-maintaining fibers such that light passing between the single-mode fibers and the polarization-maintaining fibers pass through said prism.

41. The method of claim 40 wherein said prism is selected from the group consisting of a combiner-isolator block, a splitter-isolator block, and an isolator block.

42. The method of claim 40 wherein said prism is a Wollaston prism.

43. The method of claim 41 wherein the prism comprises two birefringent wedged crystals and Faraday rotator plate positioned between the wedged crystals.

44. The method of claim 24 further comprising the steps of:
providing a prism holder;
placing the prism on the seat of the prism holder; and
applying liquid adhesive adjacent to the border of the prism and the prism holder such that said adhesive is drawn between the surfaces of the prism and the prism holder.

45. A multi-channel optical package comprising:
an input ferrule having a first capillary extending axially through said ferrule, said capillary satisfying a predetermined tolerance for the dimensions of said capillary;
at least two input optical fibers extending through said input ferrule;
an output ferrule having a second capillary extending axially through said output ferrule and satisfying a predetermined tolerance for the dimensions of said second capillary;
at least four output optical fibers extending through said output ferrule, wherein said at least four output optical fibers are polarization-maintaining fibers; and
a birefringent block positioned between said input and output ferrules such that light signals input via said input fibers are processed by said block and directed to said output fibers.

46. The multi-channel optical package of claim 45 wherein said input optical fibers are signal-mode optical fibers.

47. The multi-channel optical package of claim 45 wherein said birefringent block is selected from a group consisting of an isolator, a combiner-splitter, a combiner-isolator, and a splitter-isolator.

48. The multi-channel optical package of claim 46 wherein splitting planes of said polarization-maintaining fibers are substantially parallel.

49. The multi-channel optical package of claim 48 wherein the splitting planes of said polarization-maintaining fibers are parallel within a tolerance of two degrees.

50. A birefringent optical package comprising:
an input ferrule having a first capillary extending axially through said ferrule;
at least two input optical fibers extending through said input ferrule and secured in position within a predetermined tolerance;

an output ferrule having a second capillary extending axially through said output ferrule;

at least four output optical fibers extending through said output ferrule and secured in position within a predetermined tolerance, wherein said at least four output optical fibers are polarization-maintaining fibers; and a birefringent block positioned between said input and output ferrules such that light signals input via said input fibers are processed by said block and directed to said output fibers.

51. The birefringent optical package of claim 50 wherein the tolerance for the position of said input optical fibers is 2.0 μm.

52. The birefringent optical package of claim 50 wherein the tolerance for the position of said input optical fibers is 1.0 μm.

53. The birefringent optical package of claim 50 wherein the tolerance for the position of said input optical fibers is 0.5 μm.

54. The birefringent optical package of claim 50 wherein the tolerance for the position of said output optical fibers is 1.0 μm.

55. The birefringent optical package of claim 50 wherein at least one of said input and output optical fibers is a polarization-maintaining fiber.

* * * * *